(12) United States Patent
Zhang et al.

(10) Patent No.: US 12,628,228 B2
(45) Date of Patent: May 12, 2026

(54) RE-ESTABLISHMENT METHOD AND COMMUNICATION APPARATUS

(71) Applicant: Huawei Technologies Co., Ltd., Shenzhen (CN)

(72) Inventors: Liangliang Zhang, Beijing (CN); Junren Chang, Beijing (CN); Zhenhua Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 579 days.

(21) Appl. No.: 17/890,900

(22) Filed: Aug. 18, 2022

(65) Prior Publication Data

US 2022/0394802 A1      Dec. 8, 2022

Related U.S. Application Data

(63) Continuation of application No. PCT/CN2021/076803, filed on Feb. 19, 2021.

(30) Foreign Application Priority Data

Feb. 19, 2020     (CN) .......................... 202010103185.4

(51) Int. Cl.
*H04W 76/19*      (2018.01)
*H04W 36/00*      (2009.01)
(Continued)

(52) U.S. Cl.
CPC ....... *H04W 76/19* (2018.02); *H04W 36/0055* (2013.01); *H04W 76/18* (2018.02); *H04W 76/27* (2018.02)

(58) Field of Classification Search
CPC ........ H04W 4/00; H04W 36/00; H04W 36/08
See application file for complete search history.

(56) References Cited

U.S. PATENT DOCUMENTS

2018/0279193 A1      9/2018  Park et al.
2019/0182881 A1      6/2019  Teyeb et al.
(Continued)

FOREIGN PATENT DOCUMENTS

CN          109327833 A      2/2019
CN          110351896 A      10/2019
(Continued)

OTHER PUBLICATIONS

Intel Corporation, "Daps failure handling," 3GPP TSG RAN WG2 Meeting #108, R2-1914840, Reno, USA, Total 5 pages, 3rd Generation Partnership Project, Valbonne, France (Nov. 18-22, 2019).
(Continued)

*Primary Examiner* — Sulaiman Nooristany
(74) *Attorney, Agent, or Firm* — Leydig, Voit & Mayer, Ltd.

(57) ABSTRACT

A re-establishment method includes: If a link failure occurs in a handover procedure of a terminal device, the terminal device releases configuration information used in a source cell. The terminal device further determines a re-establishment request message based on configuration information used in the target cell, and sends the re-establishment request message in a re-establishment cell. A method for selecting a re-establishment cell and releasing configuration information when a link failure occurs in a dual active protocol stack (DAPS) handover procedure of the terminal device reduces memory consumption of the terminal device.

20 Claims, 10 Drawing Sheets

(51) Int. Cl.
    *H04W 76/18*     (2018.01)
    *H04W 76/27*     (2018.01)

(56)           References Cited

U.S. PATENT DOCUMENTS

| | | | |
|---|---|---|---|
| 2020/0022035 A1 | 1/2020 | Kadiri et al. | |
| 2020/0045764 A1* | 2/2020 | Kim | H04W 36/00695 |
| 2020/0314716 A1* | 10/2020 | Kim | H04W 36/0079 |
| 2021/0360503 A1 | 11/2021 | Lu et al. | |
| 2023/0370933 A1* | 11/2023 | Kim | H04W 24/10 |

FOREIGN PATENT DOCUMENTS

| | | | |
|---|---|---|---|
| CN | 110637478 A | 12/2019 |
| WO | 2018014154 A1 | 1/2018 |
| WO | 2018117313 A1 | 6/2018 |
| WO | 2018182231 A1 | 10/2018 |

OTHER PUBLICATIONS

VIVO, "Discussion on the signaling procedures of the RUDI HO," 3GPP TSG-RAN WG2 Meeting #107bis, R2-1912350, Chongqing, China, Total 4 pages, 3rd Generation Partnership Project, Valbonne, France (Oct. 14-18, 2019).

VIVO, "Single or two RRC messages for DAPS handover," E-Meeting, 3GPP TSG-RAN WG2 Meeting #109 electronic, R2-2000382, Total 4 pages, 3rd Generation Partnership Project, Valbonne, France (Feb. 24-Mar. 6, 2020).

LG Electronics Inc., "Handling Excess of UE Capability in DAPS HO," 3GPP TSG-RAN WG2 Meeting #108, Reno, USA, R2-1916210, Revision of R2-1913864, Total 3 pages, 3rd Generation Partnership Project, Valbonne, France (Nov. 18-22, 2019).

Huawei et al., "Discussion on subsequent RRC procedures after DAPS handover," 3GPP TSG-RAN WG2 #109bis-e, R2-2003046, Total 3 pages, 3rd Generation Partnership Project, Valbonne, France (Apr. 20-30, 2020).

Ericsson, "Open issues at fallback to source cell at DAPS handover," 3GPP TSG-RAN WG2 #109 electronic, Elbonia, Tdoc R2-2000125, Total 8 pages (Feb. 24-Mar. 6, 2020).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.7.0, Total 962 pages (Sep. 2019).

ETRI, "Source Cell Release in DAPS Handover," 3GPP TSG-RAN WG2 Meeting #108, Reno, USA, R2-1915041 (Revision of R2-1913798), Total 4 pages (Nov. 18-22, 2019).

"3rd Generation Partnership Project; Technical Specification Group Radio Access Network; NR; NR and NG-RAN Overall Description; Stage 2 (Release 15)," 3GPP TS 38.300 V15.8.0, Total 99 pages (Dec. 2019).

Ericsson et al., "Introduction of Even futher Mobility enhancement in E-UTRAN," 3GPP TSG-RAN2 Meeting #109-e, Electronic meeting, R2-2001129, Total 81 pages (Feb. 24-Mar. 6, 2020).

ETSI MCC, "Report of 3GPP TSG RAN2#107bis meeting, Chongqing, China," 3GPP TSG-RAN WG2 meeting #108, R2-1914301, Total 3 pages (Oct. 14-18, 2019).

VIVO, "Clarification on stopping the source link failure," 3GPP TSG-RAN WG2 Meeting #109 electronic, E-Meeting, R2-2000381, Total 4 pages (Feb. 24-Mar. 2, 2020).

"3rd Generation Partnership Project; Technical Specification Group Radio Access Network; NR; User Equipment (UE) procedures in Idle mode and RRC Inactive state (Release 15)," 3GPP TS 38.304 V15.6.0, Total 30 pages (Dec. 2019).

"3rd Generation Partnership Project; Technical Specification Group Radio Access Network; NR; Radio Link Control (RLC) protocol specification (Release 15)," 3GPP TS 38.322 V15.5.0, Total 33 pages (Mar. 2019).

"3rd Generation Partnership Project; Technical Specification Group Radio Access Network; NR; Packet Data Convergence Protocol (PDCP) specification (Release 15)," 3GPP TS 38.323 V15.6.0, Total 26 pages (Jun. 2019).

"3rd Generation Partnership Project; Technical Specification Group Radio Access Network; NR; Radio Resource Control (RRC) protocol specification (Release 15)," 3GPP TS 38.331 V15.8.0, Total 532 pages (Dec. 2019).

Intel Corporation, "Control Plane Signaling Flow for DAPS Based RUDI HO," 3GPP TSG RAN WG2 #107bis, Chongqing, China, R2-1912777 revision of R2-1909572, XP051804617, total 3 pages, 3rd Generation Partnership Project, Valbonne, France (Oct. 14-18, 2019).

China Telecom, "Stage-2 CR for Introduction of Even Further Mobility Enhancement in E-UTRAN," 3GPP TSG-RAN2 Meeting #109, Athens, Greece, R2-2001653, XP051849944, total 35 pages, 3rd Generation Partnership Project, Valbonne, France (Feb. 24-28, 2020).

Ericsson, "Subsequent RRC Procedures after DAPS Handover," 3GPP TSG-RAN WG2 #109 electronic, Elbonia, Tdoc R2-2000129, XP051848492, total 28 pages, 3rd Generation Partnership Project, Valbonne, France (Feb. 24-Mar. 6, 2020).

Vivo, "Discussion on the RLF and HOF for Daps," 3GPP TSG-RAN WG2 Meeting #107, Prague, Czech Republic, R2-1909775 revision of R2-1905975, XP051767570, total 8 pages, 3rd Generation Partnership Project, Valbonne, France (Aug. 26-30, 2019).

\* cited by examiner

Method 200

Method 300

Method 400

Method 500

Method 600

Method 800

Method 900

Method 1000

Method 1100

RE-ESTABLISHMENT METHOD AND COMMUNICATION APPARATUS

CROSS-REFERENCE TO RELATED APPLICATIONS

This application is a continuation of International Application No. PCT/CN2021/076803, filed on Feb. 19, 2021, which claims priority to Chinese Patent Application No. 202010103185.4, filed on Feb. 19, 2020. The disclosures of the aforementioned applications are hereby incorporated by reference in their entireties.

TECHNICAL FIELD

This application relates to the communication field, and more specifically, to a re-establishment method and a communication apparatus in the communication field.

BACKGROUND

Currently, in a conventional radio resource control (RRC) re-establishment procedure after a radio link failure (RLF), a re-establishment request message sent by a terminal device to a network device to which a re-establishment cell belongs includes a parameter corresponding to configuration information that is being used by the terminal device.

However, in a procedure in which the terminal device hands over from a source cell to a target cell, if a link failure occurs, the terminal device needs to re-establish an RRC connection. For example, when the terminal device successfully hands over to the target cell but has not received, from a target network device, a message indicating the terminal device to release a link between a source network device and the terminal device, the terminal device receives a reconfiguration message from the target network device, and a reconfiguration failure occurs on the terminal device. Consequently, a radio link failure occurs on the terminal device in the target cell. In this case, the terminal device stores both configuration information used in the source cell and configuration information used in the target cell. Therefore, how the terminal device performs re-establishment based on the stored configuration information becomes an urgent problem to be resolved.

SUMMARY

This application provides a re-establishment method, which is applicable to a link failure scenario in a handover procedure. A terminal device may initiate RRC re-establishment based on stored configuration information.

According to a first aspect, a re-establishment method is provided, where the method is applicable to a terminal device. The method includes: receiving a handover command from a source network device, where the handover command indicates the terminal device to hand over from a source cell to a target cell, the handover command includes first configuration information, and the first configuration information is configuration information used in the target cell; determining that a link failure occurs; releasing second configuration information, where the second configuration information is configuration information used in the source cell; determining a first cell; determining a radio resource control (RRC) re-establishment request message based on the first configuration information; and sending the RRC re-establishment request message in the first cell.

The first cell is a cell in which re-establishment is initiated.

Based on the foregoing technical solution, in a procedure of handing over from the source cell to the target cell the terminal device releases the configuration information used in the source cell if the link failure occurs, so that a part of memory of the terminal device can be released. This simplifies implementation of the terminal device. In addition, after the configuration information used in the source cell is released, the terminal device has only the configuration information used in the target cell. This resolves a problem that the terminal device cannot send the RRC re-establishment request message based on the stored configuration information.

According to a second aspect, a re-establishment method is provided, where the method is applicable to a terminal device. The method includes: receiving a handover command from a source network device, where the handover command indicates the terminal device to hand over from a source cell to a target cell, the handover command includes first configuration information, and the first configuration information is configuration information used in the target cell; determining that a link failure occurs; releasing the first configuration information; determining a first cell; determining an RRC re-establishment request message based on second configuration information, where the second configuration information is configuration information used in the source cell; and sending the RRC re-establishment request message in the first cell.

The first cell is a cell in which re-establishment is initiated.

Based on the foregoing technical solution, in a procedure of handing over from the source cell to the target cell the terminal device releases the configuration information used in the target cell if the link failure occurs, so that a part of memory of the terminal device can be released. This simplifies implementation of the terminal device. In addition, after the configuration information used in the target cell is released, the terminal device has only the configuration information used in the source cell. This resolves a problem that the terminal device cannot send the RRC re-establishment request message based on the stored configuration information.

According to a third aspect, a re-establishment method is provided, where the method is applicable to a terminal device. The method includes: receiving a handover command from a source network device, where the handover command indicates the terminal device to hand over from a source cell to a target cell, the handover command includes first configuration information, and the first configuration information is configuration information used in the target cell; determining that a link failure occurs; determining a first cell; releasing second configuration information based on the first cell, where the second configuration information is configuration information used in the source cell; determining an RRC re-establishment request message based on the first configuration information; and sending the RRC re-establishment request message in the first cell.

The first cell is a cell in which re-establishment is initiated.

Based on the foregoing technical solution, in a procedure of handing over from the source cell to the target cell the terminal device first selects the first cell based on implementation inside the terminal device or a preconfiguration if the link failure occurs, and then chooses to release the configuration information used in the source cell based on the first cell. This resolves a problem that the terminal device cannot send the RRC re-establishment request message based on the stored configuration information. In addition, because the configuration information used in the source cell is released based on the determined first cell, it can be ensured that the RRC re-establishment request message determined based on the reserved configuration information better matches the determined first cell.

According to a fourth aspect, a re-establishment method is provided, where the method is applicable to a terminal device. The method includes: receiving a handover command from a source network device, where the handover command indicates the terminal device to hand over from a source cell to a target cell, the handover command includes first configuration information, and the first configuration information is configuration information used in the target cell; determining that a link failure occurs; determining a first cell; releasing the first configuration information based on the first cell; determining an RRC re-establishment request message based on second configuration information, where the second configuration information is configuration information used in the source cell; and sending the RRC re-establishment request message in the first cell.

The first cell is a cell in which re-establishment is initiated.

Based on the foregoing technical solution, in a procedure of handing over from the source cell to the target cell, the terminal device first selects the first cell based on implementation inside the terminal device or a preconfiguration if the link failure occurs, and then chooses to release the configuration information used in the target cell based on the first cell. This resolves a problem that the terminal device cannot send the RRC re-establishment request message based on the stored configuration information. In addition, because one piece of configuration information in the configuration information used in the target cell is released based on the determined first cell, it can be ensured that the re-establishment request message determined based on the reserved configuration information better matches the determined first cell.

With reference to any one of the first aspect to the fourth aspect, in some possible implementations, the determining that a link failure occurs includes: after successfully accessing the target cell, determining that the link failure occurs; performing dual active protocol stack (DAPS) handover, and after successfully accessing the target cell, determining that the link failure occurs; performing DAPS handover, and after successfully accessing the target cell and before releasing the second configuration information, determining that the link failure occurs; or performing DAPS handover, and after successfully accessing the target cell and before receiving a first message from a target network device, determining that the link failure occurs, where the first message indicates to release the second configuration information or indicates to release the source cell.

With reference to any one of the first aspect to the fourth aspect, in some possible implementations, the determining that a link failure occurs includes: determining that the link failure occurs if it is determined that one or more of the following cases occur in the target cell or the source cell:

an RRC connection reconfiguration failure occurs;
integrity check fails;
a quantity of radio link control (RLC) retransmissions reaches a preset threshold;
a timer T310 expires;
random access fails and a timer T311 is not running;
in a DAPS handover scenario, a radio link failure occurs in the target cell; or in a DAPS handover scenario, a radio link failure occurs in the target cell and a radio link failure occurs in the source cell.

With reference to any one of the first aspect to the fourth aspect, in some possible implementations, the determining that an RRC connection reconfiguration failure occurs in the target cell includes: receiving a first reconfiguration message from the network device in the target cell, where the first reconfiguration message includes third configuration information, and the third configuration information is new configuration information used in the target cell; performing reconfiguration based on the first reconfiguration message; and determining that the RRC connection reconfiguration failure occurs in the target cell.

With reference to any one of the first aspect to the fourth aspect, in some possible implementations, before the receiving a first reconfiguration message from a target network device, the method further includes: in a DAPS handover procedure, after successfully accessing the target cell and before receiving the first message from the target network device, receiving the first reconfiguration message from the target network device, where the first message indicates to release the second configuration information or indicates to release the source cell.

With reference to any one of the first aspect to the fourth aspect, in some possible implementations, the determining that a link failure occurs includes: determining that the link failure occurs if it is determined that one or more of the following cases occur in a handover procedure:

inter-system handover fails; or
intra-system handover fails.

With reference to any one of the first aspect to the fourth aspect, in some possible implementations, the first reconfiguration message includes first indication information, and the first indication information indicates to release the second configuration information.

With reference to any one of the first aspect to the fourth aspect, in some possible implementations, the re-establishment request message includes second indication information, and the second indication information indicates the link failure.

With reference to any one of the first aspect to the fourth aspect, in some possible implementations, the method further includes: in the DAPS handover procedure, starting a timer after successfully accessing the target cell; before receiving the first message from the target network device, determining that the timer expires, where the first message indicates to release the second configuration information; and sending a second message to the target network device, where the second message indicates that the first message is not received or indicates that the first message fails to be received.

With reference to the first aspect or the third aspect, in some possible implementations, the re-establishment request message includes one or more of the following parameters: a physical cell identifier (PCI) of the target cell, a cell-radio network temporary identifier (C-RNTI) used in the target cell, or a short message authentication code for integrity (short MAC-I) used in the target cell.

With reference to the second aspect or the fourth aspect, in some possible implementations, the re-establishment request message includes one or more of the following parameters: a PCI of the source cell, a C-RNTI used in the source cell, and a short MAC-I used in the source cell.

With reference to the third aspect, in some possible implementations, the first cell is a cell to which a target network device belongs or a cell to which a non-source network device belongs.

With reference to the fourth aspect, in some possible implementations, the first cell is a cell to which a source network device belongs or a cell to which a non-target network device belongs.

According to a fifth aspect, a communication method is provided. The method is applicable to a terminal device. The method includes: in a DAPS handover procedure, after successfully accessing a target cell, starting a timer; before receiving a first message from a network device to which the target cell belongs, determining that the timer expires, where the first message indicates to release a configuration of a source cell; and releasing the configuration used in the source cell.

Based on the foregoing technical solution, in the DAPS handover procedure, the terminal device may start the timer after accessing the target cell. If the timer expires, if the terminal device has not received, from the network device to which the target cell belongs, a message for releasing configuration information used in the source cell, the terminal device may actively release the configuration information used in the source cell. This avoids a problem that the terminal device needs to maintain the configuration information used in the source cell for a long time in the DAPS handover procedure.

With reference to the fifth aspect, in some possible implementations, the method further includes: sending a second message to the network device to which the target cell belongs, where the second message indicates that the first message is not received, or indicates that the first message fails to be received.

According to a sixth aspect, a communication method is provided. The method is applicable to a terminal device. The method includes: in a DAPS handover procedure, after successfully accessing a target cell, starting a timer; before receiving a first message from a network device to which the target cell belongs, determining that the timer expires, where the first message indicates to release a configuration of a source cell; sending a second message to the network device, where a fourth message indicates that the first message is not received or indicates that the first message fails to be received; receiving the first message from the network device; and releasing the configuration used in the source cell.

Based on the foregoing technical solution, in the DAPS handover procedure, the terminal device may start the timer after accessing the target cell. If the timer expires, if the terminal device has not received, from the network device to which the target cell belongs, a message for releasing configuration information used in the source cell, the terminal device may send a message to the network device to which the target cell belongs, to indicate that the terminal device does not receive the message for releasing the configuration information used in the source cell. Further, the network device to which the target cell belongs may send or re-send, to the terminal device, the message for releasing the configuration information used in the source cell. Further, the terminal device releases the configuration information used in the source cell. This avoids a problem that the terminal device needs to maintain the configuration information used in the source cell for a long time in the DAPS handover procedure.

With reference to the sixth aspect, in some possible implementations, the method further includes: sending a third message to the network device, where the third message indicates that the first message is received.

With reference to the sixth aspect, in some possible implementations, the first message carries a first RRC signaling identifier.

According to a seventh aspect, a communication apparatus is provided, and includes a transceiver unit and a processing unit.

The transceiver unit is configured to receive a handover command from a source network device, where the handover command indicates a terminal device to hand over from a source cell to a target cell, the handover command includes first configuration information, and the first configuration information is configuration information used in the target cell. The processing unit is configured to determine that a link failure occurs. The processing unit is further configured to release second configuration information, where the second configuration information is configuration information used in the source cell. The processing unit is further configured to determine a first cell. The processing unit is further configured to determine an RRC re-establishment request message based on the first configuration information. The transceiver unit is further configured to send the RRC re-establishment request message in the first cell.

The first cell is a cell in which re-establishment is initiated.

According to an eighth aspect, a communication apparatus is provided, and includes a transceiver unit and a processing unit.

The transceiver unit is configured to receive a handover command from a source network device, where the handover command indicates a terminal device to hand over from a source cell to a target cell, the handover command includes first configuration information, and the first configuration information is configuration information used in the target cell. The processing unit is configured to determine that a link failure occurs. The processing unit is further configured to release the first configuration information. The processing unit is further configured to determine a first cell. The processing unit is further configured to determine an RRC re-establishment request message based on second configuration information, where the second configuration information is configuration information used in the source cell. The transceiver unit is further configured to send the RRC re-establishment request message in the first cell.

The first cell is a cell in which re-establishment is initiated.

According to a ninth aspect, a communication apparatus is provided, and includes a transceiver unit and a processing unit.

The transceiver unit is configured to receive a handover command from a source network device, where the handover command indicates a terminal device to hand over from a source cell to a target cell, the handover command includes first configuration information, and the first configuration information is configuration information used in the target cell. The processing unit is configured to determine that a link failure occurs. The processing unit is further configured to determine a first cell. The processing unit is further configured to release second configuration information based on the first cell, where the second configuration information is configuration information used in the source cell. The processing unit is further configured to determine an RRC re-establishment request message based on the first configuration information. The transceiver unit is further configured to send the RRC re-establishment request message in the first cell.

The first cell is a cell in which re-establishment is initiated.

According to a tenth aspect, a communication apparatus is provided, and includes a transceiver unit and a processing unit.

The transceiver unit is configured to receive a handover command from a source network device, where the handover command indicates a terminal device to hand over from a source cell to a target cell, the handover command includes first configuration information, and the first configuration information is configuration information used in the target cell. The processing unit is configured to determine that a link failure occurs. The processing unit is further configured to determine a first cell. The processing unit is further configured to release the first configuration information based on the first cell. The processing unit is further configured to determine an RRC re-establishment request message based on second configuration information, where the second configuration information is configuration information used in the source cell. The transceiver unit is further configured to send the RRC re-establishment request message in the first cell.

The first cell is a cell in which re-establishment is initiated.

With reference to any one of the seventh aspect to the tenth aspect, in some possible implementations, the processing unit is specifically configured to: after successfully accessing the target cell, determine that the link failure occurs; perform DAPS handover, and after successfully accessing the target cell, determine that the link failure occurs; perform DAPS handover, and after successfully accessing the target cell and before releasing the second configuration information, determine that the link failure occurs; or perform DAPS handover, and after successfully accessing the target cell and before receiving a first message from a target network device, determine that the link failure occurs, where the first message indicates to release the second configuration information or indicates to release the source cell.

With reference to any one of the seventh aspect to the tenth aspect, in some possible implementations, the processing unit is specifically configured to determine that the link failure occurs if it is determined that one or more of the following cases occur in the target cell or the source cell:

an RRC connection reconfiguration failure occurs;

integrity check fails;

a quantity of RLC retransmissions reaches a preset threshold;

a timer T310 expires;

random access fails and a timer T311 is not running;

in a DAPS handover scenario, a radio link failure occurs in the target cell; or in a DAPS handover scenario, a radio link failure occurs in the target cell and a radio link failure occurs in the source cell.

With reference to any one of the seventh aspect to the tenth aspect, in some possible implementations, the transceiver unit is further configured to receive a first reconfiguration message from the target network device, where the first reconfiguration message includes third configuration information, and the third configuration information is new configuration information used in the target cell. The processing unit is further configured to perform reconfiguration based on the first reconfiguration message. The processing unit is further configured to determine that the RRC connection reconfiguration failure occurs in the target cell.

With reference to any one of the seventh aspect to the tenth aspect, in some possible implementations, in a DAPS handover procedure, after successfully accessing the target cell and before receiving the first message from the target network device, the transceiver unit is further configured to receive the first reconfiguration message from the target network device, where the first message indicates to release the second configuration information or indicates to release the source cell.

With reference to any one of the seventh aspect to the tenth aspect, in some possible implementations, the processing unit is specifically configured to determine that the link failure occurs if it is determined that one or more of the following cases occur in a handover procedure:

inter-system handover fails; or intra-system handover fails.

With reference to any one of the seventh aspect to the tenth aspect, in some possible implementations, the first reconfiguration message includes first indication information, and the first indication information indicates to release the second configuration information.

With reference to any one of the seventh aspect to the tenth aspect, in some possible implementations, the re-establishment request message includes second indication information, and the second indication information indicates the link failure.

With reference to any one of the seventh aspect to the tenth aspect, in some possible implementations, the processing unit is further configured to: in the DAPS handover procedure, start a timer after successfully accessing the target cell. The processing unit is further configured to: before receiving the first message from the target network device, determine that the timer expires, where the first message indicates to release the second configuration information. The transceiver unit is further configured to send a second message to the target network device, where the second message indicates that the first message is not received or indicates that the first message fails to be received.

With reference to the seventh aspect or the ninth aspect, in some possible implementations, the re-establishment request message includes one or more of the following parameters: a PCI of the target cell, a C-RNTI used in the target cell, and a short MAC-I used in the target cell.

With reference to the eighth aspect or the tenth aspect, in some possible implementations, the re-establishment request message includes one or more of the following parameters: a PCI of the source cell, a C-RNTI used in the source cell, and a short MAC-I used in the source cell.

With reference to the ninth aspect, in some possible implementations, the first cell is a cell to which a target network device belongs or a cell to which a non-source network device belongs.

With reference to the tenth aspect, in some possible implementations, the first cell is a cell to which a source network device belongs or a cell to which a non-target network device belongs.

According to an eleventh aspect, a communication apparatus is provided, and includes a transceiver unit and a processing unit.

The processing unit is configured to: in a DAPS handover procedure, after successfully accessing a target cell, start a timer. The processing unit is further configured to: before receiving a first message from a network device to which the target cell belongs, determine that the timer expires, where the first message indicates to release a configuration of a source cell. The processing unit is further configured to release the configuration used in the source cell.

With reference to the eleventh aspect, in some possible implementations, the transceiver unit is configured to send a second message to the network device to which the target cell belongs, where the second message indicates that the first message is not received, or indicates that the first message fails to be received.

According to a twelfth aspect, a communication apparatus is provided, and includes a transceiver unit and a processing unit.

The processing unit is configured to: in a DAPS handover procedure, after successfully accessing a target cell, start a timer. The processing unit is further configured to: before receiving a first message from a network device to which the target cell belongs, determine that the timer expires, where the first message indicates to release a configuration of a source cell. The transceiver unit is further configured to send a second message to the network device, where the second message indicates that the first message is not received or indicates that the first message fails to be received. The transceiver unit is further configured to receive the first message from the network device. The processing unit is further configured to release the configuration used in the source cell.

With reference to the twelfth aspect, in some possible implementations, the transceiver unit is further configured to send a third message to the network device, where the third message indicates that the first message is received.

With reference to the twelfth aspect, in some possible implementations, the first message carries a first RRC signaling identifier.

According to a thirteenth aspect, a communication apparatus is provided, and includes a processor and a communication interface. The processor is coupled to a memory, and may be configured to execute instructions in the memory, to implement the method according to any possible implementation of the first aspect to the sixth aspect. Optionally, the ranging device further includes a memory.

In an implementation, the communication apparatus is a terminal device. When the communication apparatus is the terminal device, the communication interface may be a transceiver or an input/output interface.

In another implementation, the communication apparatus is a chip configured in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a fourteenth aspect, a communication apparatus is provided. The communication apparatus includes an input circuit, an output circuit, and a processing circuit. The processing circuit is configured to: receive a signal by using the input circuit, and transmit a signal by using the output circuit, to enable the processor to perform the method according to any one of the possible implementations of the first aspect to the sixth aspect.

In a specific implementation process, the communication apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a fifteenth aspect, a communication apparatus is provided, and includes a processor and a communication interface. The processor is configured to: read instructions stored in the memory, receive a signal by using a receiver, and transmit a signal by using a transmitter, to perform the method according to any one of the possible implementations of the first aspect to the sixth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The communication apparatus in the fifteenth aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, may be located outside the processor and exist independently.

According to a sixteenth aspect, a computer program product is provided. The computer program product includes a computer program (which may also be referred to as code or instructions). When the computer program is run, a computer is enabled to perform the method in any one of the possible implementations of the first aspect to the sixth aspect.

According to a seventeenth aspect, a computer-readable medium is provided. The computer-readable medium stores a computer program (also referred to as code or instructions). When the computer program is run on a computer, the computer is enabled to perform the method according to any one of the possible implementations of the first aspect to the sixth aspect.

DESCRIPTION OF EMBODIMENTS

Figure 1:
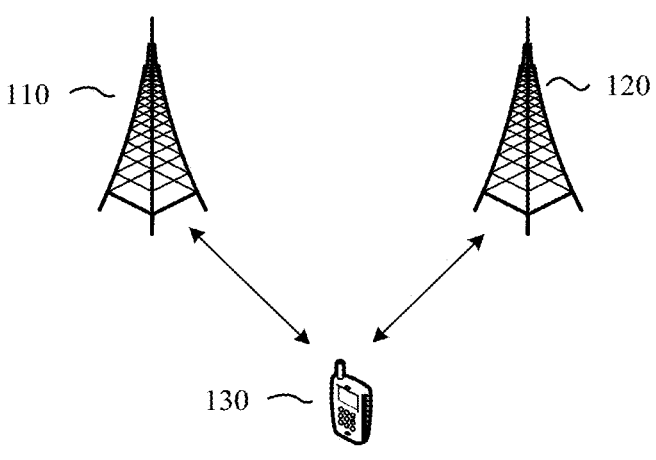
FIG. 1 is a schematic diagram of a communication system according to a method according to an embodiment of this application.

The following describes technical solutions of this application with reference to accompanying drawings.

Technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) communication system or a new radio access technology (NR) system, a vehicle-to-everything (vehicle-to-X, V2X) system, a long term evolution-vehicle (LTE-V) system, an internet of vehicles system, a machine type communication (MTC) system, an internet of things (IoT) system, a long term evolution-machine (LTE-M) system, a machine to machine (M2M) system, and the like, where V2X may include vehicle to network (V2N), vehicle to vehicle (V2V), vehicle to infrastructure (V2I), vehicle to pedestrian (V2P).

In embodiments of this application, a network device may be any device having a wireless transceiver function. The device includes but is not limited to: an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. The device may alternatively be a gNB or a transmission point (TRP or TP) in a 5G system, for example, an NR system or one or a group of antenna panels (including a plurality of antenna panels) of a base station in the 5G system, or the device may alternatively be a network node that constitutes a gNB or a transmission point, for example, a baseband unit (BBU) or a distributed unit (DU).

In some deployments, a gNB may include a centralized unit (CU) and a DU. The gNB may further include an active antenna unit (AAU). The CU implements some functions of the gNB, and the DU implements some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (CN). This is not limited in this application.

The network device serves a cell, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

In embodiments of this application, the terminal device includes user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (pad), a computer having wireless transmission and reception functions, a virtual reality (VR) terminal device, an augmented reality (AR) terminal device, a wireless terminal in industrial control, a wireless terminal in unmanned driving (self driving), a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smartwatches or smart glasses, and devices that focus on only one type of application function and need to work with other devices such as smartphones, such as various smart bands or smart jewelry for monitoring physical signs.

In addition, the terminal device may alternatively be a terminal device in an internet of things (IoT) system. The IoT is an important part of future information technology development. A main technical feature of the IoT is to connect things to a network by using a communication technology, to implement an intelligent network for human-machine interconnection and thing-thing interconnection.

A specific form of the terminal device is not limited in this application.

To facilitate understanding of embodiments of this application, a communication system to which embodiments of this application are applicable is first described in detail with reference to FIG. 1. FIG. 1 is a schematic diagram of a communication system applicable to a communication method and a communication apparatus according to an embodiment of this application. As shown in FIG. 1, the communication system 100 may include at least two network devices, for example, a network device 110 and a network device 120 shown in FIG. 1. The communication system 100 may further include at least one terminal device, for example, a terminal device 130 shown in FIG. 1. The terminal device 130 may be mobile or fixed. Both the network device 110 and the network device 120 are devices such as base stations or base station controllers that can communicate with the terminal device 130 over a radio link. Each network device can provide communication coverage for a particular geographic area, and can communicate with a terminal device within the coverage area (a cell).

FIG. 1 shows an example in which there are two network devices and one terminal device. Optionally, the communication system 100 may include at least one network device, and another quantity of terminal devices may be included in a coverage area of each network device. This is not limited in this embodiment of this application.

A plurality of antennas may be configured for each communication device such as the network device 110, the network device 120, or the terminal device 130 in FIG. 1. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communication system 100 may further include another network entity such as a network controller or a mobility management entity. This is not limited in embodiments of this application.

To facilitate understanding of embodiments of this application, the following first briefly describes terms used in this application.

1. RRC re-establishment: When a handover failure, a reconfiguration failure, an integrity check failure, an RLF, or the like occurs on a terminal device, the terminal device may initiate an RRC re-establishment procedure.

For example, the RRC re-establishment procedure may include the following steps:

Step 1: The terminal device sends an RRC re-establishment request message to a re-establishment cell (or a network device to which the cell belongs).

Step 2: If the re-establishment cell allows the request of the terminal device, send an RRC re-establishment message to the terminal device.

Step 3: The terminal device sends an RRC re-establishment complete message to the re-establishment cell.

Herein, the re-establishment cell may be a cell determined by the terminal device through cell search or detection. The re-establishment cell may be a cell that meets a predefined criterion, for example, a cell selection S criterion in the NR protocol TS38.304-f30. For brevity, details are not described herein. It should be noted that the process in which the terminal device sends the message to the cell is essentially that the terminal device sends the message to the network device to which the cell belongs. The network device to which the cell belongs is, for example, a serving base station of the cell. For brevity of expression, "the terminal device sends the message to the cell" is used for description in this application.

An RRC re-establishment procedure after an RRC reconfiguration failure in an RLF is used as an example to describe an RRC procedure.

It is assumed that a serving base station of the terminal device is a base station #1, and a corresponding serving cell is a cell #1. In this case, the terminal device uses a configuration #1 provided by the base station #1 for the terminal device.

Step 1: The terminal device receives an RRC reconfiguration message from the base station #1, where the RRC reconfiguration message includes a configuration #2.

Step 2: The terminal device performs reconfiguration based on the RRC reconfiguration message. If the RRC reconfiguration failure occurs, the terminal device continues to use the configuration #1, and starts a re-establishment procedure.

Step 3: The terminal device selects an appropriate re-establishment cell, starts an RRC re-establishment procedure, and sends a re-establishment request message to the re-establishment cell. Specifically, the re-establishment request message includes a parameter used by the terminal device in the cell #1, and specifically includes a KRRCint key and an integrity protection algorithm that correspond to the configuration #1 and that are used by the terminal device in the cell #1, a C-RNTI and a short MAC-I used in the cell #1, and a physical cell identifier (PCI) of the cell #1.

2. RRC connection: Before normal communication, a terminal device may establish an RRC connection to a network device, namely, an RRC connection to a cell. When the RRC connection is disconnected, the terminal device cannot perform normal communication.

3. Cell: The cell is described from a perspective of a higher layer, that is, from a perspective of resource management, mobility management, or a service unit. A coverage area of each network device may be divided into one or more cells, and each cell may be corresponding to one or more frequencies. In other words, each cell may be considered as an area formed by coverage areas of one or more frequencies.

It should be noted that the cell may be an area within coverage of a wireless network of a network device. In embodiments of this application, different cells may correspond to a same network device or different network devices. For example, a network device to which a cell #1 belongs and a network device to which a cell #2 belongs may be different network devices, for example, base stations. In other words, the cell #1 and the cell #2 may be managed by different base stations. Alternatively, for another example, a network device that manages a cell #1 and a network device that manages a cell #2 may alternatively be different radio frequency processing units of a same base station, for example, radio remote units (RRUs). In other words, the cell #1 and the cell #2 may be managed by a same base station and have a same baseband processing unit and a same intermediate frequency processing unit, but have different radio frequency processing units. Alternatively, for still another example, a network device to which a cell #1 belongs and a network device to which a cell #2 belongs may be a same network device, for example, a base station. That is, the cell #1 and the cell #2 may be managed by the same base station. In this case, the cell #1 and the cell #2 may be referred to as being co-sited. This is not particularly limited in this application.

As described above, in some possible deployments, a gNB may include a CU and a DU. In this deployment, the cell #1 and the cell #2 may be managed by a same CU and a same DU, in other words, share a CU and a DU. The cell #1 and the cell #2 may be managed by a same CU and different DUs, in other words, share a CU but do not share a DU. Alternatively, the cell #1 and the cell #2 may be managed by different CUs and different DUs, in other words, do not share a CU and do not share a DU.

4. Handover: In a wireless communication system, when a terminal device moves from a cell to/is close to another cell, handover needs to be performed to ensure that communication of the terminal device is not interrupted. In this embodiment of this application, a source cell represents a cell that provides a service for the terminal device before the handover, and a target cell represents a cell that provides a service for the terminal device after the handover. Related information (for example, a physical cell identifier of the target cell, frequency information, and information about a random access resource required for handing over to the target cell) of the target cell may be indicated by using a handover message. The handover message is sent to the terminal device by a network device (namely, a source network device) to which the source cell belongs.

The handover may be an intra-base station handover or an inter-base station handover. The intra-base station handover may mean that the source cell and the target cell belong to a same network device (for example, a base station). The source cell and the target cell may be a same cell or different cells. The inter-base station handover means that the source cell and the target cell belong to different network devices (for example, base stations). This is not limited in this application.

It should be understood that a cell is a coverage area of a network device, the source cell corresponds to a source network device (for example, a source base station), and the target cell corresponds to a target network device (for example, a target base station).

It should be further understood that the source cell and the target cell may belong to a same network device, in other words, the source cell and the target cell may be co-sited. In this case, for a specific terminal device, a TA corresponding to the target cell may be equal to a TA corresponding to the source cell. Alternatively, the target cell may be a small cell. In this case, for a specific terminal device, a TA of the target cell may be 0.

5. Dual active protocol stack handover (DAPS HO): To ensure zero interruption during a handover procedure of a terminal device, the DAPS handover is introduced in a communication industry standard.

In a conventional handover procedure, after receiving a handover command of a source network device, a terminal device disconnects from a source cell, and access a target cell. Different from conventional handover, in the DAPS handover procedure, after receiving a handover command sent by a source network device, the terminal device accesses a target cell, and maintains communication with a link of a source cell. The terminal device stops communication with the source cell and releases a communication link to the source cell only when a target network device indicates the terminal device to completely release a configuration used in the source cell.

The DAPS handover procedure is similar to the conventional handover procedure. The source network device determines to perform handover, and then the source network device sends a handover request to the target network device. Further, the target network device returns a handover acknowledgment message to the source network device, to indicate that the terminal can be handed over to the target cell. Further, the source network device sends the handover command to the terminal device, to indicate the terminal device to hand over to the target cell. Then, the terminal device maintains connections to both the source cell and the target cell. After the terminal device successfully accesses the target cell and establishes a new connection to a core network, the core network hands over a downlink data stream to the target network device, and delivers an end marker data packet to the source network device at the same time. Then, the source network device forwards the data to the target network device. After the target network device receives the end marker packet, the target network device may indicate the terminal device to release the connection to the source cell, to complete the DAPS handover procedure.

In the DAPS handover procedure, after the terminal device successfully accesses the target network device, the terminal device stops sending new uplink data to the source network device. After the terminal device successfully releases the connection to the source cell, the terminal device stops all communication with the source network device. After the terminal device successfully accesses the target network device, the source network device receives a handover success indication message sent by the target network device. Then, the source network device stops sending new downlink data to the terminal device. Before the terminal device successfully releases the connection to the source cell, the source network device does not send new downlink data to the terminal device, but sends retransmitted downlink data.

As described above, in an RRC re-establishment procedure caused by an RRC reconfiguration failure, a re-establishment request message sent by the terminal device to a network device to which a re-establishment cell belongs includes configuration information being used by the terminal device, namely, a parameter corresponding to a configuration used by the terminal device before the terminal device obtains an RRC reconfiguration message.

However, in a procedure in which the terminal device hands over from the source cell to the target cell, if a link failure, a reconfiguration failure, or an integrity check failure occurs on the terminal device, and a re-establishment procedure is triggered, the terminal device has both configuration information used in the source cell and configuration information used in the target cell. Therefore, the terminal device has a problem of how to send a re-establishment request message based on the stored configuration information.

For example, in the DAPS handover procedure, the terminal device successfully accesses the target cell. Before the terminal device receives, from the target network device, indication information for releasing the configuration information used in the source cell, the terminal device receives the RRC reconfiguration message from the target network device. The RRC reconfiguration message includes new configuration information provided by the target cell for the terminal device. If an RRC reconfiguration failure occurs, the terminal device has both the configuration information used in the source cell and the original configuration information used in the target cell. In this case, the terminal device has the problem of how to send the re-establishment request message based on the stored configuration information.

Based on this, this application provides a communication method. In a handover procedure of a terminal device, after determining that an RLF occurs, the terminal device may initiate RRC re-establishment.

For ease of understanding of embodiments of this application, the following descriptions are first provided before embodiments of this application are described.

First, in embodiments of this application, "indicate" may include directly indicate and indirectly indicate, or may include an explicit indication and an implicit indication. Information indicated by information is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. The to-be-indicated information may alternatively be indirectly indicated by indicating other information, where there is an association relationship between the other information and the to-be-indicated information. Alternatively, only a part of the to-be-indicated information may be indicated, and the other part of the to-be-indicated information is known or pre-agreed on. For example, it may alternatively be agreed upon in advance (for example, specified in a protocol) that the to-be-indicated information is to be indicated depending on whether an information element exists, thereby reducing indication overheads to some extent.

Second, the terms "first", "second", and various numbers in the following embodiments are merely used for differentiation for ease of description, and are not used to limit the scope of embodiments of this application. For example, the various numbers are used for distinguishing between different indication information or different time intervals.

Third, "predefinition" or "preconfiguration" may be implemented by pre-storing corresponding code or a corresponding table in a device (for example, including a terminal device or a network device) or in another manner that can indicate related information. A specific implementation of "predefinition" or "preconfiguration" is not limited in this application. "Storage" may be storage in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form, and this is not limited in this application.

Fourth, a "protocol" in embodiments of this application may be a standard protocol in the communication field, for example, may include an LTE protocol, an NR protocol, and a related protocol applied to a future communication system. This is not limited in this application.

Fifth, "at least one" means one or more, and "a plurality of" means two or more. At least one of the following items (pieces) or a similar expression thereof refers to any combination of these items, including any combination of singular items (pieces) or plural items (pieces). For example, at least one of a, b, and c may represent: a, b, c, a and b, a and c, b and c, or a, b, and c, where a, b, and c each may be singular or plural.

Sixth, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation, and do not mean any other limitation.

Seventh, for ease of describing embodiments of this application, unless otherwise specified, all used message names are message names in NR. However, it may be understood that these message names are merely examples for ease of understanding, and shall not constitute any limitation on this application. This application does not exclude a possibility that another message name is defined in a future protocol to replace the message names listed in this application to implement a same or similar function. In addition, the message names in NR are used as an example to describe embodiments of this application, and shall not constitute any limitation on a scenario to which the method provided in this application is applicable. For example, the method provided in this application is also applicable to an LTE system. When the method provided in this application is applied to the LTE system, "RRC reconfiguration", "RRC re-establishment", and the like in the following embodiments may be respectively replaced with "RRC connection reconfiguration", "RRC connection re-establishment", and the like. For brevity, examples are not listed one by one herein.

Eighth, the following describes a plurality of embodiments in detail with reference to a plurality of flowcharts. However, it should be understood that the flowcharts and related descriptions of corresponding embodiments thereof are merely examples for ease of understanding, and shall not constitute any limitation on this application. Each step in each flowchart does not necessarily need to be performed. For example, some steps may be skipped. In addition, an execution sequence of each step is not fixed, and is not limited to that shown in the figure. The execution sequence of each step is determined based on a function and internal logic of the step.

The following describes in detail a method provided in embodiments of this application with reference to the accompanying drawings.

It should be understood that, for ease of understanding and description only, interaction between a terminal device and a network device is used as an example below to describe in detail the method provided in embodiments of this application. However, this should not constitute any limitation on an execution body of the method provided in this application. For example, the terminal device shown in the following embodiments may be replaced with a component (for example, a chip or a circuit) configured in the terminal device. The network device shown in the following embodiments may also be replaced with a component (for example, a chip or a circuit) configured in the network device.

A specific structure of an execution body of a method provided in embodiments of this application is not specifically limited in the following embodiments, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

It should be noted that "KRRCint key and integrity protection algorithm used in a target cell" mentioned in embodiments of this application are a KRRCin key and an integrity protection algorithm that are used in a procedure of communication between the terminal device and the target cell. "KRRCint key and integrity protection algorithm used in a source cell" mentioned in embodiments of this application are a KRRCint key and an integrity protection algorithm that are used in a procedure of communication between the terminal device and the source cell.

It should be further noted that, in this embodiment, a network device #1 is a source network device, namely, a network device to which the source cell belongs; a network device #2 is a network device to which a first cell belongs, namely, a network device to which a re-establishment cell belongs; and a network device #3 is a target network device, namely, a network device to which the target cell belongs.

The network device #2 may be a network device to which a target cell of the terminal device in a previous handover procedure belongs (the network device #3). In other words, the network device #2 is the network device #3. The network device #2 and the network device #3 are a same device. For example, when the first cell is a cell to which the network device #3 belongs, the network device #2 and the network device #3 are the same device.

Alternatively, the network device #2 may be a network device to which a source cell of the terminal device in a previous handover procedure belongs (the network device #1). In other words, the network device #2 is the network device #1. The network device #2 and the network device #1 are a same device. For example, when the first cell is a cell to which the network device #1 belongs, the network device #2 and the network device #1 are the same device.

Certainly, the network device #2 may be a network device different from the network device #3 or the network device #1. For example, if the first cell is not a cell to which the network device #3 belongs, or is not a cell to which the network device #1 belongs, the network device #2 and the network device #3 are not a same network device, or the network device #2 and the network device #1 are not a same network device.

Figure 2:
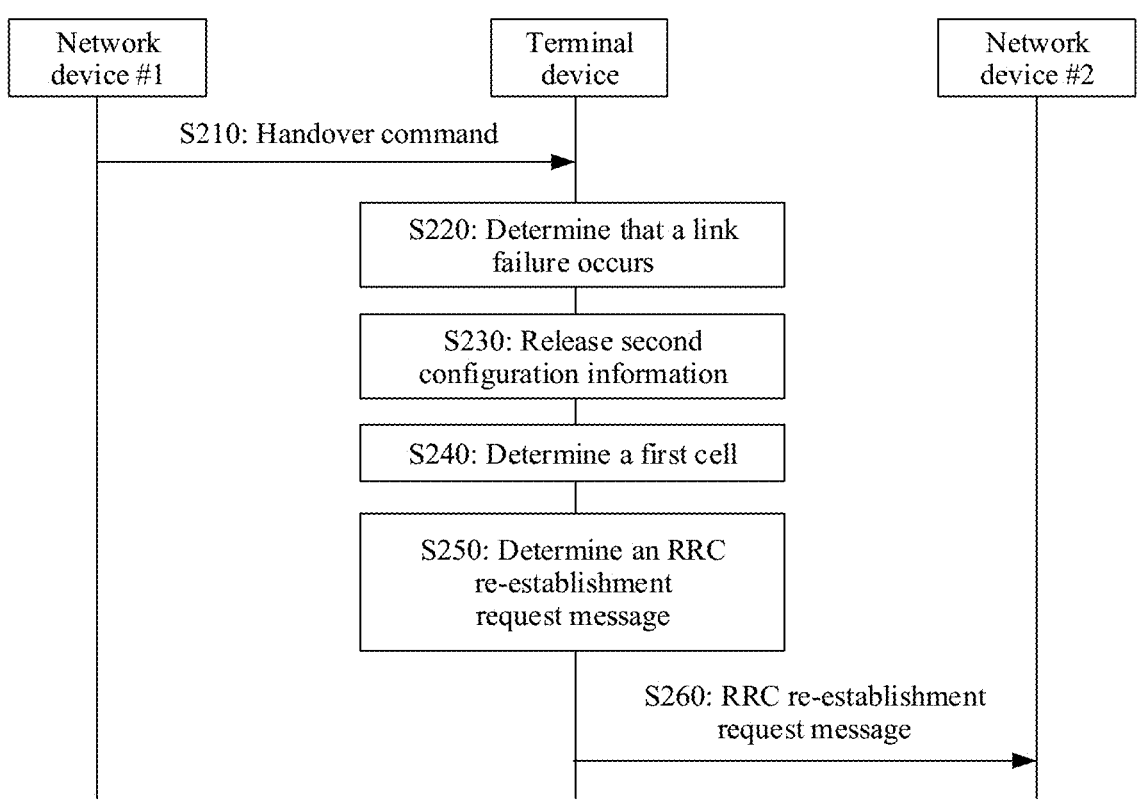
FIG. 2 to FIG. 10 are schematic flowcharts of a reestablishment method according to an embodiment of this application.

FIG. 2 is a schematic flowchart of a re-establishment method 200 according to an embodiment of this application and from a device interaction perspective. As shown in FIG. 2, the method 200 may include S210 to S260. The following describes steps in the method 200 in detail.

S210: A terminal device receives a handover command from a network device #1 (a source network device), where the handover command indicates the terminal device to hand over from a source cell to a target cell.

The handover command includes configuration information #1 (an example of first configuration information), and the configuration information #1 is configuration information used by the terminal device in the target cell, or configuration information used by the terminal device for communication in the target cell, or configuration information provided by a target network device for the terminal device, or configuration information that is provided by the target network device for the terminal device and that is used for communication in the target cell.

The configuration information #1 includes at least one of the following: a PCI of the target cell, a C-RNTI provided by the target network device for the terminal device, a target network device security algorithm identifier for a selected security algorithm (the target gNB security algorithm identifiers for the selected security algorithms), a random access channel (RACH) resource, and a system message of the target cell.

Certainly, the configuration information #1 may include more parameters. This is not limited in this embodiment of this application.

It may be understood that, in a procedure in which the terminal device hands over from the source cell to the target cell, the terminal device does not release configuration information #2 (an example of second configuration information), and the configuration information #2 is configuration information used by the terminal device in the source cell, or configuration information used by the terminal device for communication in the source cell.

The configuration information #2 includes at least one of the following: a PCI of the source cell, a measurement configuration, a mobility control configuration, a radio resource configuration, an access stratum (AS) security configuration, and a C-RNTI provided by the source network device for the terminal device.

The radio resource configuration may be a radio bearer (RB) configuration, a main media access control (MAC) configuration, a physical channel configuration, or the like.

The configuration information #2 may further include more parameters. This is not limited in this embodiment of this application.

S220: The terminal device determines that a link failure occurs.

In an implementation, the terminal device may determine that the link failure occurs if it is determined that one or more of the following cases occur in the target cell or the source cell:

1. An RRC connection reconfiguration failure occurs.

For example, the terminal device receives a reconfiguration message #1 from a network device to which the source cell belongs. The reconfiguration message #1 includes configuration information #3, and the configuration information #3 is new configuration information that is used in the source cell and that is different from the configuration information #2. The terminal device performs reconfiguration based on the reconfiguration message #1. The terminal device determines that the RRC connection reconfiguration failure occurs in the source cell. If it is determined that the RRC connection reconfiguration failure occurs, the terminal device releases the configuration information #3, and continues to use the configuration information #2 used in the source cell. The configuration information #2 is the configuration information used by the terminal device in the source cell before the terminal device receives the reconfiguration message #1.

For another example, the terminal device receives a reconfiguration message #2 (an example of a first reconfiguration message) from a network device to which the target cell belongs. The reconfiguration message #2 includes configuration information #4 (an example of third configuration information), and the configuration information #4 is new configuration information that is used in the target cell and that is different from the configuration information #1. The terminal device performs reconfiguration based on the reconfiguration message #2. The terminal device determines that the RRC connection reconfiguration failure occurs in the target cell. If it is determined that the RRC connection reconfiguration failure occurs, the terminal device releases the configuration information #4, and continues to use the configuration information #1 used in the target cell. The configuration information #1 is the configuration information used by the terminal device in the target cell before the terminal device receives the reconfiguration message #2.

Optionally, the reconfiguration message #2 may further include first indication information, and the first indication information indicates the terminal device to release the configuration information #2.

A DAPS handover procedure is used as an example. In the DAPS handover procedure, if the terminal device does not receive a first message from the network device to which the target cell belongs, or before receiving the first message from the network device to which the target cell belongs, or before releasing the configuration information #2, the terminal device receives the reconfiguration message #2 from the network device to which the target cell belongs. The reconfiguration message #2 includes the configuration information #4. The terminal device performs reconfiguration based on the reconfiguration message. Then, the terminal device determines that the RRC connection reconfiguration failure occurs in the target cell. The first message indicates the terminal device to release the configuration information #2, or indicate the terminal device to release the configuration information #2 used by the terminal device in the source cell, or indicate the terminal device to release a link between the terminal device and the source cell, or indicate the terminal device to release a link between the terminal device and the source network device.

2. Integrity check fails.

For example, this may mean that the terminal device receives an indication of an integrity check failure.

For another example, this may mean that the terminal device receives an indication of an integrity check failure from a lower layer.

Specifically, this may mean, but is not limited to, that the terminal device receives, in the target cell, the indication of the integrity check failure from the lower layer; or that the terminal device receives, in the source cell, the indication of the integrity check failure from the lower layer; or that the terminal device determines, in the target cell, that the integrity check fails; or that the terminal device determines, in the source cell, the indication of the integrity check failure from the lower layer.

3. A quantity of RLC retransmissions reaches a preset threshold.

To be specific, a quantity of RLC retransmissions from the source network device to the terminal device reaches a preset threshold. Alternatively, a quantity of data retransmissions from the terminal device to the source cell reaches a preset threshold of the quantity of RLC retransmissions. Alternatively, a quantity of uplink RLC retransmissions of the terminal device in the source cell reaches a maximum quantity. Alternatively, a quantity of uplink RLC retransmissions of the terminal device in the source cell reaches a preset threshold.

Alternatively, a quantity of RLC retransmissions from the target network device to the terminal device reaches a preset threshold. Alternatively, a quantity of data retransmissions from the terminal device to the target cell reaches a preset threshold of the quantity of RLC retransmissions. Alternatively, a quantity of uplink RLC retransmissions of the terminal device in the target cell reaches a maximum quantity. Alternatively, a quantity of uplink RLC retransmissions of the terminal device in the target cell reaches a preset threshold.

Specifically, the terminal device may send data to a network device. At a media access control (MAC) layer, a hybrid automatic repeat request (hybrid auto repeat request, HARQ) is used for ensuring that the network device correctly receives data. In addition, at an RLC layer, an RLC status report returned by the network device can also be used for confirming that the network device correctly receives the data. The terminal device learns, from the RLC status report, whether current data is successfully sent to the network device. If the network device does not acknowledge (acknowledgement, ACK) an RLC protocol data unit (PDU), the data starts to be retransmitted until the terminal device receives an ACK sent by the network device. If the quantity of RLC retransmissions reaches the preset threshold, the link failure occurs.

4. A timer 310 expires.

Specifically, downlink out-of-synchronization detection of the terminal device may be performed: If the terminal device consecutively receives N310 out-of-synchronization (out-of-sync) indications reported by a layer 1 (L1), it is considered that the terminal device is out of synchronization. At the same time, the T310 timer is started. If N311 in-synchronization (in-sync) indications are received before the T310 expires, it is considered that the terminal device restores a synchronization state. Otherwise, after the T310 expires, the terminal device triggers a re-establishment procedure and starts a T311 timer. If re-establishment still fails after the T311 expires, the terminal device enters an idle (IDLE) state.

The timer T310 is a timer used by the terminal device to detect an RLF. For example, valid duration of the T310 may be delivered to the terminal device in advance by using signaling by the network device to which the source cell belongs, or may be predefined. This is not limited in this application. The terminal device starts a timer when detecting a physical layer fault. If the terminal device fails to restore to the synchronization state within the valid duration of the timer T310, a radio link failure occurs. After the T310 expires, the terminal device triggers the re-establishment procedure.

Alternatively, valid duration of the T310 may be delivered to the terminal device in advance by using signaling by the network device to which the target cell belongs, or may be predefined. This is not limited in this application. The terminal device starts a timer when detecting a physical layer fault. If the terminal device fails to restore to the synchronization state, a radio link failure occurs. After the T310 expires, the terminal device triggers the re-establishment procedure.

5. Random access fails and a timer T311 is not running.

6. In a DAPS handover scenario, a radio link failure occurs in the target cell.

Specifically, the radio link failure in the target cell may be one or more of the following cases in the target cell:

a quantity of RLC retransmissions reaches a preset threshold;

a timer T310 expires; or random access fails and a timer T311 is not running.

7. In the DAPS handover scenario, a radio link failure occurs in the target cell and a radio link failure occurs in the source cell.

Specifically, the radio link failure in the target cell may be one or more of the following cases in the target cell:

a quantity of RLC retransmissions reaches a preset threshold;

a timer T310 expires; or random access fails and a timer T311 is not running.

Specifically, the radio link failure in the source cell may be one or more of the following cases in the source cell:

a quantity of RLC retransmissions reaches a preset threshold;

a timer T310 expires; or random access fails and a timer T311 is not running.

In another implementation, the terminal device may determine that the link failure occurs when one of the following cases occurs in the handover procedure:

1. Inter-system handover fails.

The inter-system handover refers to a handover in which the source cell and the target cell belong to different systems. For example, the source cell is an LTE cell (a cell served by an LTE base station), and a target base station is an NR cell (a cell served by a 5G base station).

2. Intra-system handover fails.

In the intra-system handover, the source cell and the target cell belong to a same system. For example, the source cell is an NR cell (a cell served by a 5G base station), and a target base station is an NR cell (namely, a cell served by the 5G base station); or for example, the source cell is an LTE cell (a cell served by an LTE base station), and the target base station is an LTE cell (namely, a cell served by the LTE base station).

S230: The terminal device releases the configuration information #2.

Optionally, the method further includes S2301: The terminal device determines to release the configuration information #2. Specifically, the terminal device may determine to release the configuration information #2 based on prior data, predefined indication information, or preconfigured priority information. For example, the terminal device preconfigures the priority information. The priority information indicates that when the link failure occurs in the handover procedure, if the terminal device stores both the configuration information #1 and the configuration information #2, the terminal device may release the configuration information #2. For another example, the terminal device stores communication quality information corresponding to the configuration information #1 and communication quality information corresponding to the configuration information #2. If determining that communication quality corresponding to the configuration information #1 is higher, the terminal device may determine to release the configuration information #2. For another example, the indication information is predefined in a protocol. The indication information indicates that when the link failure occurs in the DAPS handover procedure, if the terminal device stores both the configuration information #1 and the configuration information #2, the terminal device may release the configuration information #2. The indication information may be the priority information.

In a possible implementation, before S2301, the method further includes S2302: The terminal device receives indication information from the network device #2, where the indication information indicates a priority of applying or releasing configuration information by the terminal device. Specifically, the indication information indicates configuration information that is preferentially selected when the terminal device initiates re-establishment after determining that the link failure occurs in the handover procedure. Alternatively, the indication information indicates configuration information that is preferentially released when the terminal device initiates re-establishment after determining that the link failure occurs in the handover procedure. Optionally, the indication information may be application priority information. For example, the network device #2 may indicate, by using the application priority information, the terminal device to preferentially apply the configuration information #1. Further, the terminal device may determine to release the configuration information #2 based on the application priority information, and initiate re-establishment to a re-establishment network device based on the configuration information #1.

In another possible implementation, before S2301, the method further includes S2303: The network device #2 presets indication information, where the indication information mation indicates a priority of applying or releasing configuration information by the terminal device. Specifically, the indication information indicates configuration information that is preferentially selected when the terminal device initiates re-establishment after determining that the link failure occurs in the handover procedure. Alternatively, the indication information indicates configuration information that is preferentially released when the terminal device initiates re-establishment after determining that the link failure occurs in the handover procedure. Optionally, the indication information may be release priority information. For example, the network device may indicate, by presetting the release priority information, the terminal device to preferentially release the configuration information #2. Further, the terminal device may determine to release the configuration information #2 based on the release priority information, and initiate re-establishment to a re-establishment network device based on the configuration information #1.

That the terminal device releases the configuration information #2 may be understood as that the terminal device deletes the stored configuration information #2, or the terminal device releases a link between the terminal device and the source cell, or the terminal device releases a link between the terminal device and the source network device.

In this embodiment of this application, in the handover procedure, if determining that the link failure occurs, the terminal device releases the configuration information used in the source cell. This reduces memory consumption of the terminal device.

S240: The terminal device determines a first cell.

The first cell is a cell in which the terminal device initiates re-establishment.

The terminal device may determine the first cell based on an implementation inside the terminal device of the terminal device or according to a predefined criterion. For example, the terminal device may select, from a neighboring cell, a cell that meets the predefined criterion. The predefined criterion may be a cell selection S criterion. For example, the terminal device performs cell selection, and uses a cell that meets the cell selection S criterion as the first cell.

It should be understood that the first cell determined by the terminal device may be the target cell or another cell. This is not limited in this embodiment of this application.

S250: The terminal device determines an RRC re-establishment request message.

Specifically, the terminal device determines the RRC re-establishment request message based on the first configuration information.

The RRC re-establishment request message includes one or more of the following parameters: a PCI of the target cell, and a C-RNTI and a short MAC-I used by the terminal device in the target cell.

The short MAC-I is set to 16 least significant bits of a message authentication code for integrity (MAC-D, and calculation steps are as follows:

(1) Encode a VarShortMAC input (VarShortMAC-Input) by using abstract syntax notation.1 (abstract syntax notation.1, ASN.1).

(2) Use a KRRCint key and an integrity protection algorithm in the target cell.

(3) Set all input bits for COUNT, BEARER, and DIRECTION to binary.

Optionally, the RRC re-establishment request message may include second indication information, and the second indication information indicates the link failure. For example, the second indication information or the link failure may indicate one or more of the following:

the link failure occurs in the DAPS handover procedure;

in the DAPS handover procedure, after the terminal device successfully accesses the target cell and before the terminal device receives a source cell release message sent by the target network device to the terminal device, the link failure occurs;

in the DAPS handover procedure, after the terminal device successfully accesses the target cell and before the terminal device receives a source cell release message sent by the target network device to the terminal device, a radio link failure occurs;

in the DAPS handover procedure, after the terminal device successfully accesses the target cell and before the terminal device receives the source cell release message sent by the target network device to the terminal device, a reconfiguration failure occurs on the terminal device;

a reconfiguration failure occurs in the DAPS handover procedure, or a reconfiguration failure occurs in the target cell in the DAPS handover procedure;

in the DAPS handover procedure, a radio link failure occurs on the terminal device in the target cell and a radio link failure occurs on the terminal device in the source cell;

in the DAPS handover procedure, the terminal device successfully accesses the target cell, and integrity check fails; or in the DAPS handover procedure, after the terminal device successfully accesses the target cell and before the terminal device receives a source cell release message sent by the target network device, integrity check fails.

S260: The terminal device sends the RRC re-establishment request message in the first cell. To be specific, the terminal device sends the RRC re-establishment request message to a network device #2 (a network device to which the first cell belongs).

Optionally, after receiving the RRC re-establishment request message, the network device to which the first cell belongs searches for a context of the terminal device before RRC re-establishment based on the C-RNTI, the PCI, and the short MAC-I in the RRC re-establishment request message. Further, the network device restores RRC configuration information and security information based on the found context of the terminal device. Further, the network device re-establishes a signaling radio bearer (SRB) #1. Further, the network device sends the RRC re-establishment message to the terminal device over the SRB #1. The re-establishment message carries a nextHopChainingCount information element, and the information element indicates the terminal device to update an access stratum security key.

Optionally, the terminal device may further send a re-establishment complete message to the network device to which the first cell belongs.

In this embodiment of this application, in a procedure of handing over from the source cell to the target cell, the terminal device releases the configuration information used in the source cell if the link failure occurs, so that a part of memory of the terminal device can be released. This simplifies implementation of the terminal device. In addition, after the configuration information used in the source cell is released, the terminal device has only the configuration information used in the target cell. This resolves a problem that the terminal device cannot send the RRC re-establishment request message based on the stored configuration information.

Figure 3:
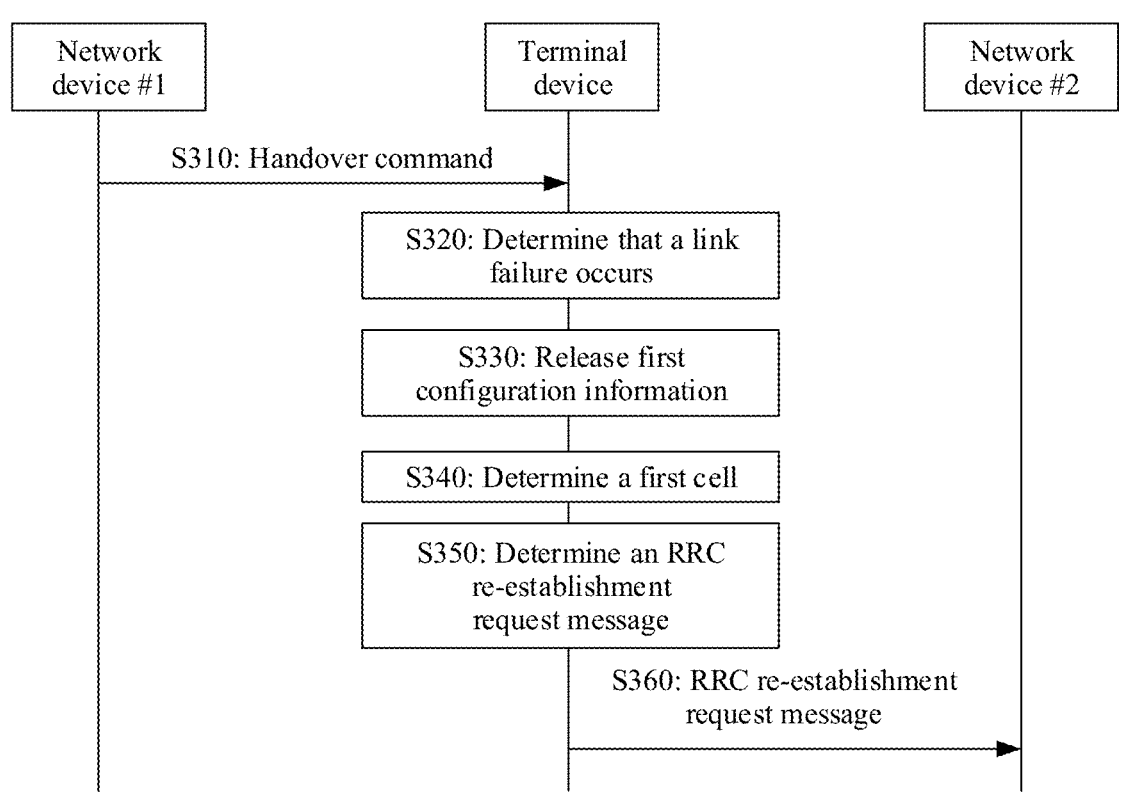

FIG. 3 is a schematic flowchart of a re-establishment method 300 according to another embodiment of this application. As shown in FIG. 3, the method 300 may include S310 to S360. S310 and S320 are the same as S210 and S220 in the method 200. For brevity, details are not described in this embodiment of this application again.

S330: The terminal device releases the configuration information #1 (an example of first configuration information).

Optionally, the method further includes S3301: The terminal device determines to release the configuration information #2. Specifically, for an implementation of the step, refer to related descriptions in S2301.

In a possible implementation, before S3301, the method further includes S3302: The terminal device receives indication information from a network device, where the indication information indicates a priority of applying or releasing configuration information by the terminal device. Specifically, for an implementation of the step, refer to related descriptions in S2302.

In another possible implementation, before S3301, the method further includes S3303: A network device presets indication information, where the indication information indicates a priority of applying or releasing configuration information by the terminal device. Specifically, for an implementation of the step, refer to related descriptions in S2303.

That the terminal device releases the configuration information #1 may be understood as that the terminal device deletes the stored configuration information #1, or the terminal device releases a link between the terminal device and the target cell, or the terminal device releases a link between the terminal device and the target network device.

In this embodiment of this application, in the handover procedure, if determining that the link failure occurs, the terminal device releases the configuration information used in the target cell. This reduces memory consumption of the terminal device.

S340: The terminal device determines a first cell.

The first cell is a cell in which the terminal device initiates re-establishment.

The terminal device may determine the first cell based on an implementation inside the terminal device of the terminal device or according to a predefined criterion. For example, the terminal device may select, from a neighboring cell, a cell that meets the predefined criterion. The predefined criterion may be a cell selection S criterion. For example, the terminal device performs cell selection, and uses a cell that meets the cell selection S criterion as the first cell.

It should be understood that the first cell determined by the terminal device may be the source cell or another cell. This is not limited in this embodiment of this application.

S350: The terminal device determines an RRC re-establishment request message.

Specifically, the terminal device determines the RRC re-establishment request message based on second configuration information.

The RRC re-establishment request message includes one or more of the following parameters: a PCI of the source cell, a C-RNTI and a short MAC-I used by the terminal device in the source cell.

The shortMAC-I is set to the 16 least significant bits of a MAC-I, and calculation steps are as follows:

(1) Encode VarShortMAC-Input by using ASN.1.

(2) Use a KRRCint key and an integrity protection algorithm in the source cell.

(3) Set all input bits for COUNT, BEARER, and DIRECTION to binary.

S360: The terminal device sends the RRC re-establishment request message in the first cell. To be specific, the terminal device sends the RRC re-establishment request message to a network device #2 (a network device to which the first cell belongs).

In this embodiment of this application, in a procedure of handing over from the source cell to the target cell the terminal device releases the configuration information used in the target cell if the link failure occurs, so that a part of memory of the terminal device can be released. This simplifies implementation of the terminal device. In addition, after the configuration information used in the target cell is released, the terminal device has only the configuration information used in the source cell. This resolves a problem that the terminal device cannot send the RRC re-establishment request message based on the stored configuration information.

Figure 4:
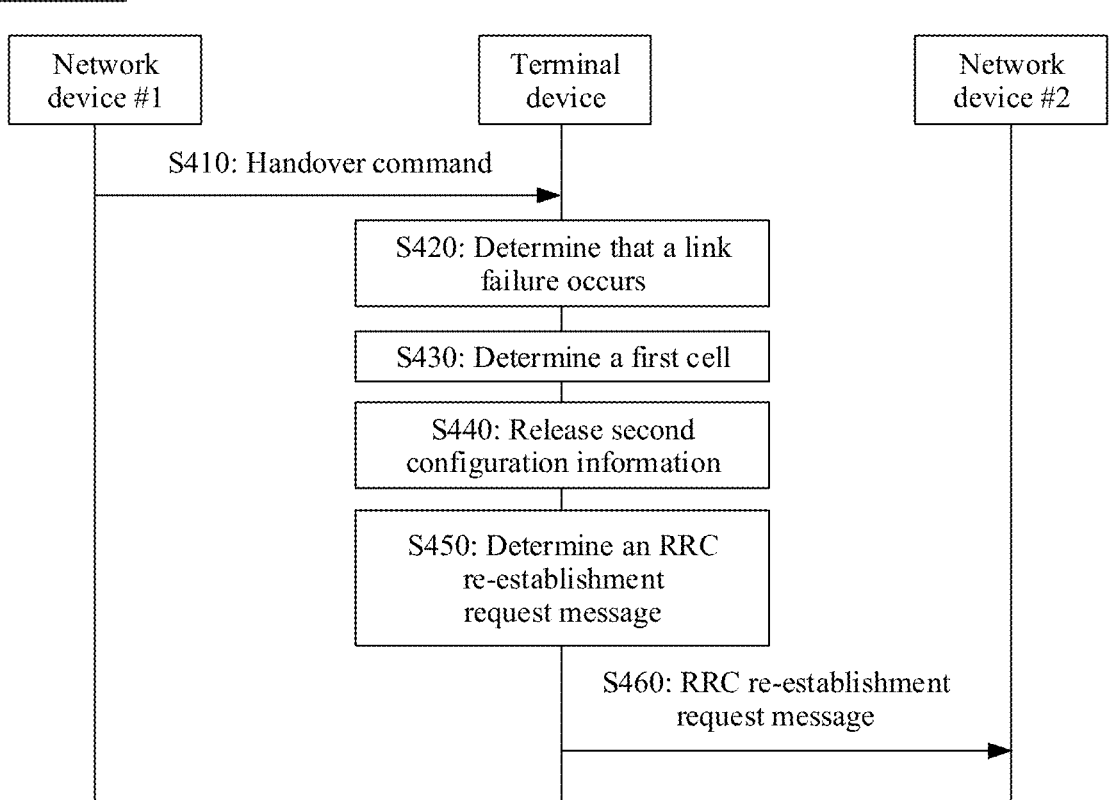

FIG. 4 is a schematic flowchart of a re-establishment method 400 according to another embodiment of this application. As shown in FIG. 4, the method 400 may include S410 to S460. S410 and S420 are the same as S210 and S220 in the method 200. For brevity, details are not described in this embodiment of this application again.

S430: The terminal device determines a first cell.

The first cell is a cell in which the terminal device initiates re-establishment.

The terminal device may determine the first cell based on an implementation inside the terminal device of the terminal device or according to a predefined criterion. For example, the terminal device may select, from a neighboring cell, a cell that meets the predefined criterion. The predefined criterion may be a cell selection S criterion. For example, the terminal device performs cell selection, and uses a cell that meets the cell selection S criterion as the first cell.

The first cell determined by the terminal device may be a cell to which the target network device belongs or a cell to which a non-source network device belongs. This is not limited in this embodiment of this application.

S440: The terminal device releases the configuration information #2 based on the first cell.

Optionally, the method further includes S4401: The terminal device determines to release the configuration information #2. Specifically, for an implementation of the step, refer to related descriptions in S2301.

In a possible implementation, before S4401, the method further includes S4402: The terminal device receives indication information from a network device, where the indication information indicates a priority of applying or releasing configuration information by the terminal device. Specifically, for an implementation of the step, refer to related descriptions in S2302.

In another possible implementation, before S4401, the method further includes S4403: A network device presets indication information, where the indication information indicates a priority of applying or releasing configuration information by the terminal device. Specifically, for an implementation of the step, refer to related descriptions in S2303.

That the terminal device releases the configuration information #2 may be understood as that the terminal device deletes the stored configuration information #2, or the terminal device releases a link between the terminal device and the source cell, or the terminal device releases a link between the terminal device and the source network device.

In this embodiment of this application, in the handover procedure, if determining that the link failure occurs, the terminal device releases, based on the determined first cell, the configuration information used in the source cell. This can ensures that the re-establishment request message determined based on the reserved configuration information better matches the first cell, and releasing the configuration information can reduce memory consumption of the terminal device.

S450: The terminal device determines an RRC re-establishment request message.

Specifically, the terminal device determines the RRC re-establishment request message based on the first configuration information.

The RRC re-establishment request message includes one or more of the following parameters: a PCI of the target cell, and a C-RNTI and a short MAC-I used by the terminal device in the target cell.

The shortMAC-I is set to the 16 least significant bits of a MAC-I, and calculation steps are as follows:

(1) Encode VarShortMAC-Input by using ASN.1.

(2) Use a KRRCint key and an integrity protection algorithm in the target cell.

(3) Set all input bits for COUNT, BEARER, and DIRECTION to binary.

Optionally, the RRC re-establishment request message may include second indication information, and the second indication information indicates the link failure. For example, the second indication information may indicate one or more of the following:

the link failure occurs in the DAPS handover procedure;

in the DAPS handover procedure, after the terminal device successfully accesses the target cell and before the terminal device receives a source cell release message sent by the target network device to the terminal device, the link failure occurs;

in the DAPS handover procedure, after the terminal device successfully accesses the target cell and before the terminal device receives a source cell release message sent by the target network device to the terminal device, a radio link failure occurs;

in the DAPS handover procedure, after the terminal device successfully accesses the target cell and before the terminal device receives the source cell release message sent by the target network device to the terminal device, a reconfiguration failure occurs on the terminal device;

a reconfiguration failure occurs in the DAPS handover procedure, or a reconfiguration failure occurs in the target cell in the DAPS handover procedure;

in the DAPS handover procedure, a radio link failure occurs on the terminal device in the target cell and a radio link failure occurs on the terminal device in the source cell;

in the DAPS handover procedure, the terminal device successfully accesses the target cell, and integrity check fails; or in the DAPS handover procedure, after the terminal device successfully accesses the target cell and before the terminal device receives a source cell release message sent by the target network device, integrity check fails.

S460: The terminal device sends the RRC re-establishment request message in the first cell. To be specific, the terminal device sends the RRC re-establishment request message to a network device #2 (a network device to which the first cell belongs).

In this embodiment of this application, in a procedure of handing over from the source cell to the target cell the terminal device first selects the first cell based on implementation inside the terminal device or a preconfiguration if the link failure occurs, and then chooses to release the configuration information used in the source cell based on the first cell. This resolves a problem that the terminal device cannot send the RRC re-establishment request message based on the stored configuration information. In addition, because the configuration information used in the source cell is released based on the determined first cell, it can be ensured that the re-establishment request message determined based on the reserved configuration information better matches the determined first cell.

Figure 5:
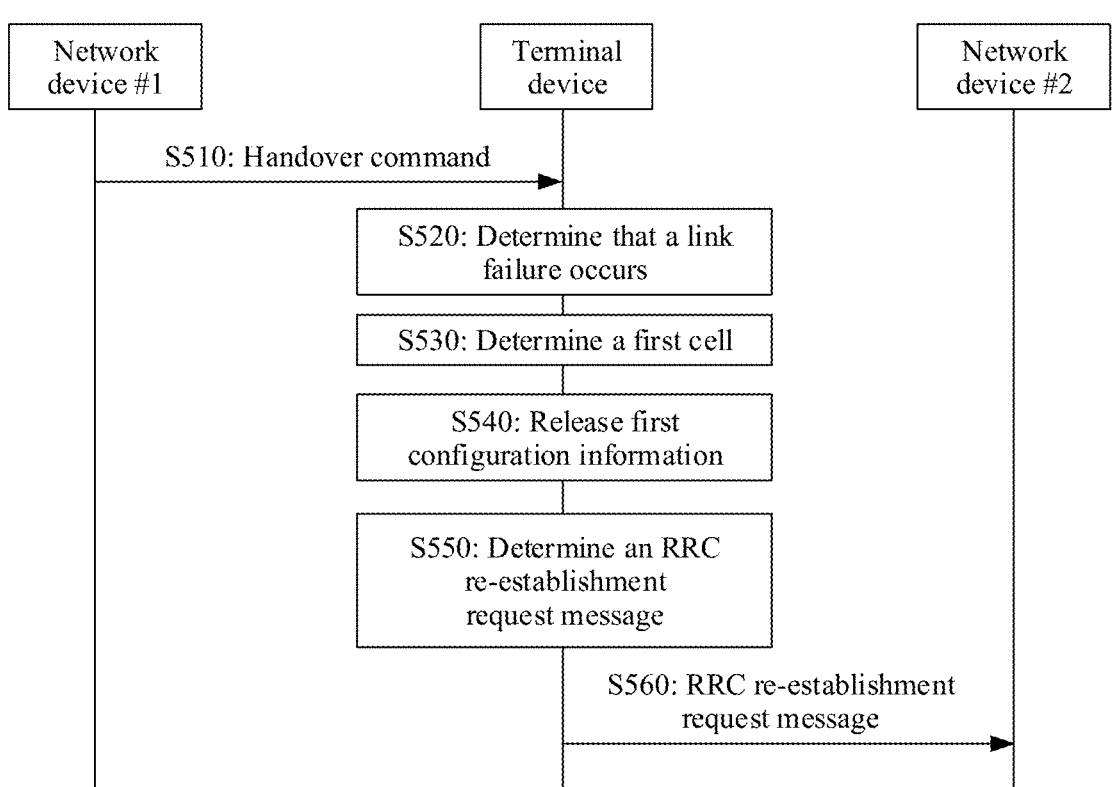

FIG. 5 is a schematic flowchart of a re-establishment method 500 according to another embodiment of this application. As shown in FIG. 5, the method 500 may include S510 to S560. S510 and S520 are the same as S210 and S220 in the method 200. For brevity, details are not described in this embodiment of this application again.

S530: The terminal device determines a first cell.

The first cell is a cell in which the terminal device initiates re-establishment.

The terminal device may determine the first cell based on an implementation inside the terminal device of the terminal device or according to a predefined criterion. For example, the terminal device may select, from a neighboring cell, a cell that meets the predefined criterion. The predefined criterion may be a cell selection S criterion. For example, the terminal device performs cell selection, and uses a cell that meets the cell selection S criterion as the first cell.

It should be understood that the first cell determined by the terminal device may be a cell to which the source network device belongs or a cell to which a non-target network device belongs. This is not limited in this embodiment of this application.

S540: The terminal device releases the configuration information #1.

Optionally, the method further includes S5401: The terminal device determines to release the configuration information #1. Specifically, for an implementation of the step, refer to related descriptions in S2301.

In a possible implementation, before S5401, the method further includes S5402: The terminal device receives indication information from a network device, where the indication information indicates a priority of applying or releasing configuration information by the terminal device. Specifically, for an implementation of the step, refer to related descriptions in S2302.

In another possible implementation, before S5401, the method further includes S5403: A network device presets indication information, where the indication information indicates a priority of applying or releasing configuration information by the terminal device. Specifically, for an implementation of the step, refer to related descriptions in S2303. That the terminal device releases the configuration information #1 may be understood as that the terminal device deletes the stored configuration information #1, or the terminal device releases a link between the terminal device and the target cell, or the terminal device releases a link between the terminal device and the target network device.

In this embodiment of this application, in the handover procedure, if determining that the link failure occurs, the terminal device releases, based on the determined first cell, the configuration information used in the target cell. This can ensures that the re-establishment request message determined based on the reserved configuration information better matches the first cell.

S550: The terminal device determines an RRC re-establishment request message.

Specifically, the terminal device determines the RRC re-establishment request message based on second configuration information.

The RRC re-establishment request message includes one or more of the following parameters: a PCI of the source cell, a C-RNTI and a short MAC-I used by the terminal device in the source cell.

The shortMAC-I is set to the 16 least significant bits of a MAC-I, and calculation steps are as follows:

(1) Encode VarShortMAC-Input by using ASN.1.

(2) Use a KRRCint key and an integrity protection algorithm in the source cell.

(3) Set all input bits for COUNT, BEARER, and DIRECTION to binary.

S560: The terminal device sends the RRC re-establishment request message in the first cell. To be specific, the terminal device sends the RRC re-establishment request message to a network device #2 (a network device to which the first cell belongs).

In this embodiment of this application, in a procedure of handing over from the source cell to the target cell the terminal device first selects the first cell based on implementation inside the terminal device or a preconfiguration if the link failure occurs, and then chooses to release the configuration information used in the target cell based on the first cell. This resolves a problem that the terminal device cannot send the RRC re-establishment request message based on the stored configuration information. In addition, because the configuration information used in the target cell is released based on the determined first cell, it can be ensured that the re-establishment request message determined based on the reserved configuration information better matches the determined first cell.

Figure 6:
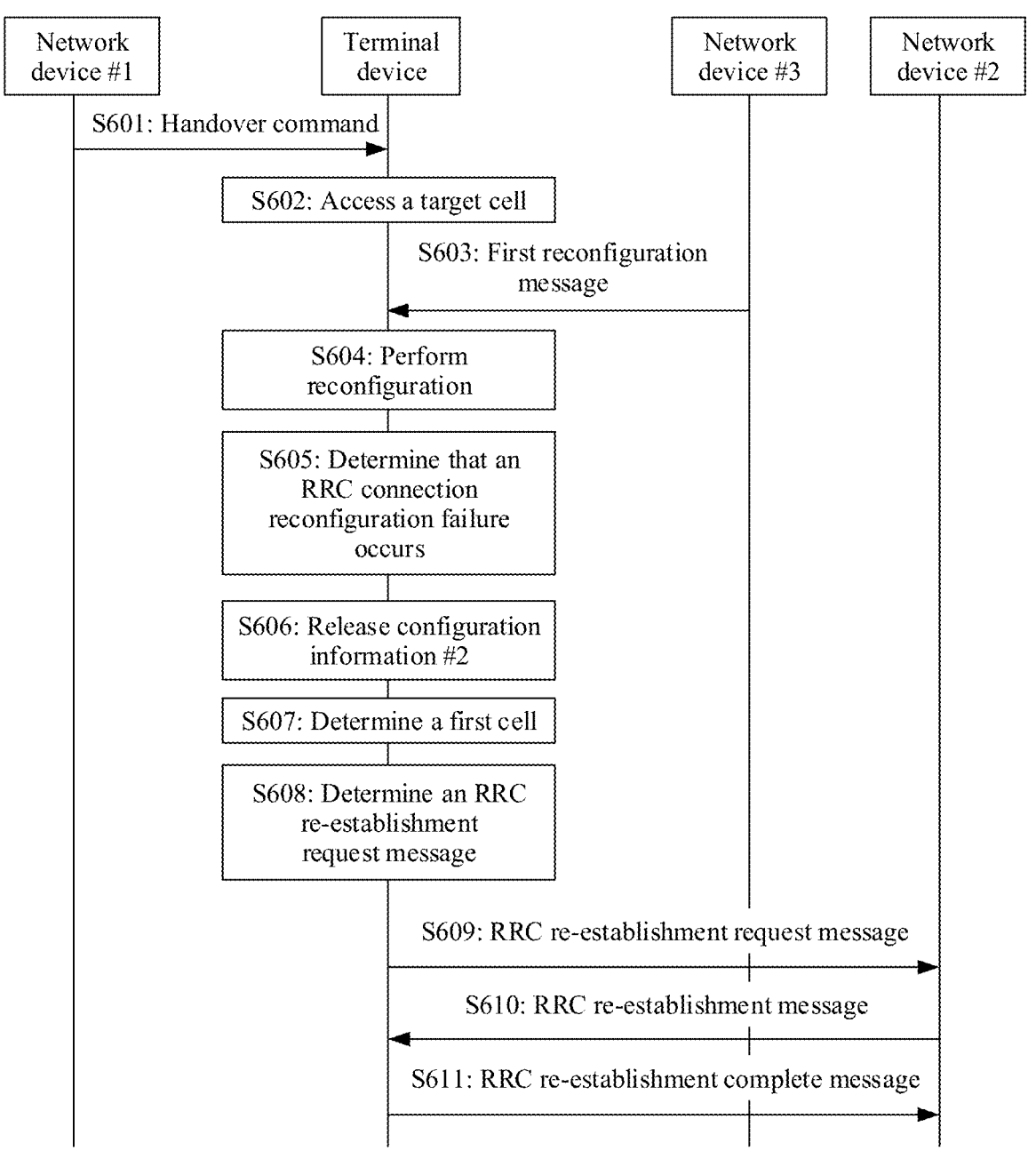

FIG. 6 shows a method for initiating RRC re-establishment by a terminal device if an RRC reconfiguration failure occurs in a target cell in a DAPS handover procedure according to an embodiment of this application. As shown in FIG. 6, the method 600 includes S601 to S611. The following describes each step in detail.

S601: A terminal device receives a handover command from a network device #1 (a source network device), where the handover command indicates the terminal device to hand over from a source cell to a target cell.

The handover command includes configuration information #1 (an example of first configuration information), and the configuration information #1 is configuration information used by the terminal device in the target cell, or configuration information used by the terminal device for communication in the target cell, or configuration information provided by a target network device for the terminal device, or configuration information that is provided by the target network device for the terminal device and that is used for communication in the target cell.

The configuration information #1 may include at least one of the following: a PCI of the target cell, a C-RNTI provided by the target network device for the terminal device, a target network device security algorithm identifier for a selected security algorithm, a RACH resource, and a system message of the target cell.

Certainly, the configuration information #1 may include more parameters. This is not limited in this embodiment of this application.

It may be understood that, in a procedure in which the terminal device hands over from the source cell to the target cell, the terminal device does not release configuration information #2 (an example of second configuration information), and the configuration information #2 is configuration information used by the terminal device in the source cell, or configuration information used by the terminal device for communication in the source cell.

The configuration information #2 may include at least one of the following: a PCI of the source cell, a measurement configuration, a mobility control configuration, a radio resource configuration, an AS security configuration, and a C-RNTI provided by the source network device for the terminal device.

The radio resource configuration may be an RB configuration, a MAC main configuration, a physical channel configuration, or the like.

The configuration information #2 may further include more parameters. This is not limited in this embodiment of this application.

S602: The terminal device successfully accesses the target cell based on the handover command.

After the terminal device successfully accesses the target cell, the terminal device uses the configuration information #1 in the target cell. If the terminal device does not receive a first message from a network device #3 (the target network device), or before the terminal device receives the first message from the network device #3, the terminal device maintains the configuration information #2, in other words, does not release the configuration information #2. The first message indicates the terminal device to release the configuration information #2.

S603: The terminal device receives a first reconfiguration message from the network device #3.

The terminal device receives the first reconfiguration message before receiving the first message. The first reconfiguration message includes new configuration information #4 (an example of third configuration information) that is used in the target cell and that is different from the configuration information #1. The first message indicates the terminal device to release the configuration information used in the source cell, or indicate the terminal device to release the configuration information used by the terminal device in the source cell, or indicate the terminal device to release a link between the terminal device and the source cell, or indicate the terminal device to release a link between the terminal device and the source network device.

Optionally, the first reconfiguration message includes first indication information, and the first indication information indicates to release configuration information #2.

S604: The terminal device performs reconfiguration based on the first reconfiguration message.

S605: The terminal device determines that a reconfiguration failure occurs.

If the reconfiguration failure occurs, the terminal device continues to use the configuration information #1 in the target cell. In addition, because the terminal device does not receive the first message, the terminal device maintains the configuration (the configuration information #2) of the UE used in the source cell, in other words, does not release the configuration information #2.

In other words, if the reconfiguration failure occurs in the target cell, the terminal device has both the configuration information #1 and the configuration information #2.

S606: The terminal device releases the configuration information #2.

Optionally, the method further includes S6061: The terminal device determines to release the configuration information #2. Specifically, for an implementation of the step, refer to related descriptions in S2301.

In a possible implementation, before S6061, the method further includes S6062: The terminal device receives indication information from a network device, where the indication information indicates a priority of applying or releasing configuration information by the terminal device. Specifically, for an implementation of the step, refer to related descriptions in S2302.

In another possible implementation, before S6061, the method further includes S6063: A network device presets indication information, where the indication information indicates a priority of applying or releasing configuration information by the terminal device. Specifically, for an implementation of the step, refer to related descriptions in S2303.

That the terminal device releases the configuration information #2 may be understood as that the terminal device deletes the stored configuration information #2, or the terminal device releases a link between the terminal device and the source cell, or the terminal device releases a link between the terminal device and the source network device.

In this embodiment of this application, in the DAPS handover procedure, if determining that the link failure occurs, the terminal device releases the configuration information used in the source cell. This reduces memory consumption of the terminal device.

S607: The terminal device determines a first cell.

The first cell is a cell in which the terminal device initiates re-establishment.

The terminal device may determine the first cell based on an implementation inside the terminal device of the terminal device or according to a predefined criterion. For example, the terminal device may select, from a neighboring cell, a cell that meets the predefined criterion. The predefined criterion may be a cell selection S criterion. For example, the terminal device performs cell selection, and uses a cell that meets the cell selection S criterion as the first cell.

It should be understood that the first cell determined by the terminal device may be a cell to which the target network device belongs or a cell to which a non-source network device belongs. This is not limited in this embodiment of this application.

S608: The terminal device determines an RRC re-establishment request message.

Specifically, the terminal device determines the RRC re-establishment request message based on the first configuration information.

The RRC re-establishment request message includes one or more of the following parameters: a PCI of the target cell, and a C-RNTI and a short MAC-I used by the terminal device in the target cell.

The shortMAC-I is set to the 16 least significant bits of a MAC-I, and calculation steps are as follows:

(1) Encode VarShortMAC-Input by using ASN.1.

(2) Use a KRRCint key and an integrity protection algorithm in the target cell.

(3) Set all input bits for COUNT, BEARER, and DIRECTION to binary.

Optionally, the RRC re-establishment request message may further include second indication information. The second indication information indicates that a reconfiguration failure occurs in the DAPS handover procedure, or a reconfiguration failure occurs in the target cell in the DAPS handover procedure; or in the DAPS handover procedure, after the terminal device successfully accesses the target cell and before the terminal device receives the source cell release message sent by the target network device to the terminal device, a reconfiguration failure occurs on the terminal device.

S609: The terminal device sends the RRC re-establishment request message in the first cell. To be specific, the terminal device sends the RRC re-establishment request message to a network device #2 (a network device to which the first cell belongs).

S610: The network device #2 sends the RRC re-establishment message to the terminal device.

S611: The terminal device sends an RRC re-establishment complete message to the network device #2.

In this embodiment of this application, in the DAPS handover procedure of the terminal device, if an RRC reconfiguration failure occurs in the target cell, the terminal device releases the configuration information used in the source cell, so that a part of memory of the terminal device can be released. This simplifies implementation of the terminal device. In addition, after the configuration information used in the source cell is released, the terminal device has only the configuration information used in the target cell. This resolves a problem that the terminal device cannot send the RRC re-establishment request message based on the stored configuration information.

Figure 7:
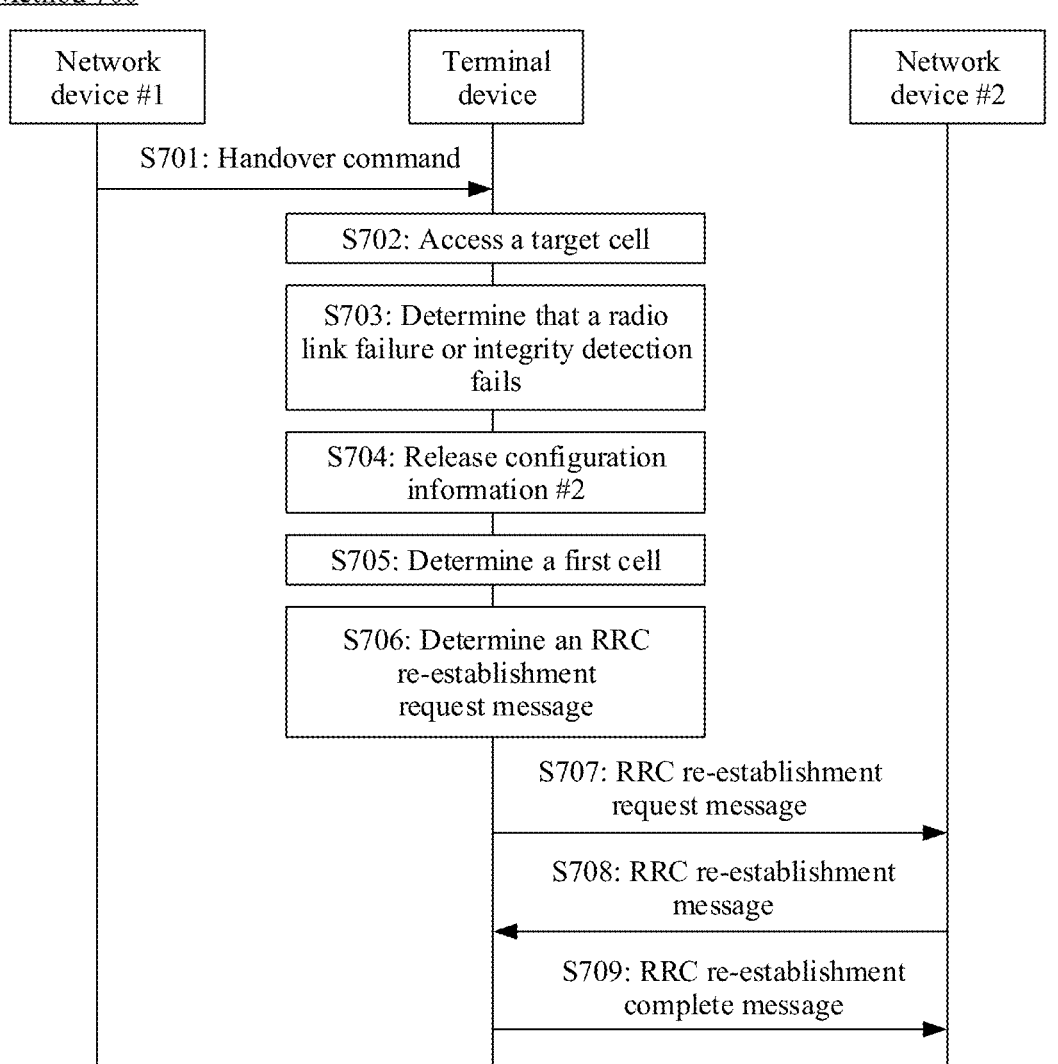

FIG. 7 shows a method for initiating RRC re-establishment by a terminal device if a link failure occurs in a target cell in a DAPS handover procedure according to an embodiment of this application. As shown in FIG. 7, the method 700 includes S701 to S709. The following describes each step in detail.

S701 is the same as S601 in the method 600. For brevity, details are not described herein again.

S702 is the same as S602 in the method 600. For brevity, details are not described herein again.

S703: Before the terminal device receives a first message, the terminal device determines that a radio link failure occurs, or the terminal device determines that integrity protection check fails.

The first message indicates the terminal device to release the configuration information used in the source cell, or indicate the terminal device to release the configuration information used by the terminal device in the source cell, or indicate the terminal device to release a link between the terminal device and the source cell, or indicate the terminal device to release a link between the terminal device and the source network device.

S704 is the same as S606 in the method 600. For brevity, details are not described herein again.

S705 is the same as S607 in the method 600. For brevity, details are not described herein again.

S706: The terminal device determines an RRC re-establishment request message.

The RRC re-establishment request message includes one or more of the following parameters: a PCI of the target cell, and a C-RNTI and a short MAC-I used by the terminal device in the target cell.

The shortMAC-I is set to the 16 least significant bits of a MAC-I, and calculation steps are as follows:

(1) Encode VarShortMAC-Input by using ASN.1.

(2) Use a KRRCint key and an integrity protection algorithm in the target cell.

(3) Set all input bits for COUNT, BEARER, and DIRECTION to binary.

Optionally, the RRC re-establishment request message may further include second indication information, and the second indication information indicates the link failure in a DAPS handover procedure.

If the terminal device determines that the radio link failure occurs in S703, the second indication information may indicate one or more of the following:

the link failure occurs in the DAPS handover procedure;

in the DAPS handover procedure, after the terminal device successfully accesses the target cell and before the terminal device receives a source cell release message sent by the target network device to the terminal device, the link failure occurs;

in the DAPS handover procedure, after the terminal device successfully accesses the target cell and before the terminal device receives a source cell release message sent by the target network device to the terminal device, a radio link failure occurs;

in the DAPS handover procedure, a radio link failure occurs on the terminal device in the target cell and a radio link failure occurs on the terminal device in the source cell; or in the DAPS handover procedure, the radio link failure occurs on the terminal device in the target cell.

If the terminal device determines that integrity check fails in S703, the second indication information may indicate one or more of the following:

in the DAPS handover procedure, the terminal device successfully accesses the target cell, and integrity check fails; or in the DAPS handover procedure, after the terminal device successfully accesses the target cell and before the terminal device receives the first message sent by the target network device, integrity check fails.

S707 to S709 are the same as S609 to S611 in the method 600. For brevity, details are not described herein again.

In this embodiment of this application, in the DAPS handover procedure of the terminal device, if the radio link failure, the integrity check failure, or the like occurs in the target cell, the terminal device releases the configuration information used in the source cell, so that a part of memory of the terminal device can be released. This simplifies implementation of the terminal device. In addition, after the configuration information used in the source cell is released, the terminal device has only the configuration information used in the target cell. This resolves a problem that the terminal device cannot send the RRC re-establishment request message based on the stored configuration information.

Figure 8:
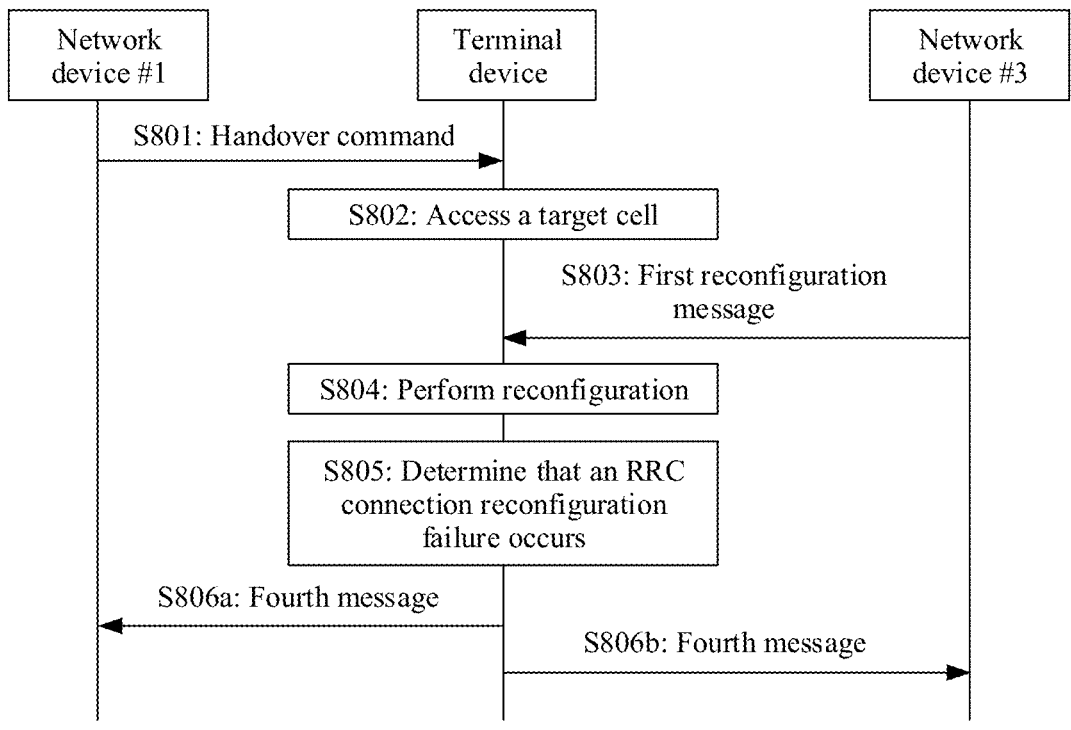

FIG. 8 shows a method for initiating RRC re-establishment by a terminal device if an RRC reconfiguration failure occurs in a target cell in a DAPS handover procedure according to an embodiment of this application. As shown in FIG. 8, the method 800 includes S801 to S806. S801 to S805 are the same as S601 to S605 in the method 600. For brevity, details are not described in this embodiment of this application again.

After S805, the terminal device may perform S806*a* or S806*b*.

S806*a*: The terminal device sends a fourth message to the network device #1, where the fourth message indicates that a link failure occurs on the terminal device.

S806*b*: The terminal device sends a fourth message to the network device #3, where the fourth message indicates that a link failure occurs on the terminal device.

Specifically, the fourth message indicates one or more of the following:

the link failure occurs in the DAPS handover procedure;

in the DAPS handover procedure, after the terminal device successfully accesses the target cell and before the terminal device receives a source cell release message sent by the target network device to the terminal device, the link failure occurs;

in the DAPS handover procedure, after the terminal device successfully accesses the target cell and before the terminal device receives the source cell release message sent by the target network device to the terminal device, a reconfiguration failure occurs on the terminal device; or a reconfiguration failure occurs in the DAPS handover procedure, or a reconfiguration failure occurs in the target cell in the DAPS handover procedure.

Figure 9:
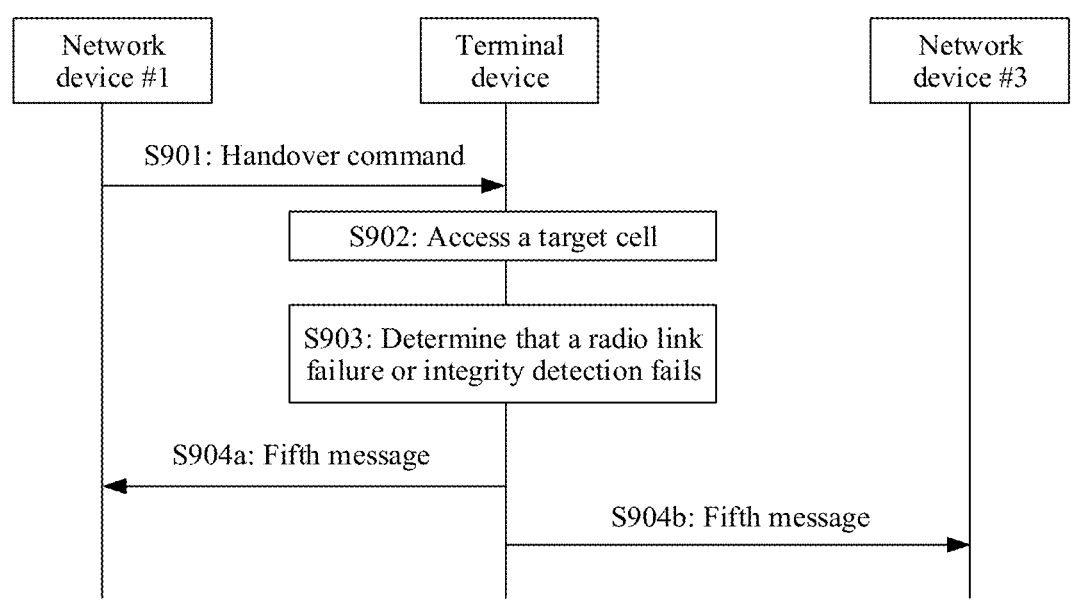

FIG. 9 shows a method for initiating RRC re-establishment by a terminal device if a link failure occurs in a target cell in a DAPS handover procedure according to an embodiment of this application. As shown in FIG. 9, the method 900 includes S901 to S904. S901 to S903 are the same as S701 to S703 in the method 700. For brevity, details are not described in this embodiment of this application again.

After S903, the terminal device may perform S904a, or may perform S904b.

S904a: The terminal device sends a fifth message to the network device #1, where the fifth message indicates that a link failure occurs on the terminal device.

S904b: The terminal device sends a fifth message to the network device #3, where the fifth message indicates that a link failure occurs on the terminal device.

If the terminal device determines that the radio link failure occurs in S903, the fifth message may indicate one or more of the following:

the link failure occurs in the DAPS handover procedure;

in the DAPS handover procedure, after the terminal device successfully accesses the target cell and before the terminal device receives a source cell release message sent by the target network device to the terminal device, the link failure occurs;

in the DAPS handover procedure, after the terminal device successfully accesses the target cell and before the terminal device receives a source cell release message sent by the target network device to the terminal device, a radio link failure occurs;

in the DAPS handover procedure, a radio link failure occurs on the terminal device in the target cell and a radio link failure occurs on the terminal device in the source cell; or in the DAPS handover procedure, the radio link failure occurs on the terminal device in the target cell.

If the terminal device determines that integrity check fails S903, the fifth message may indicate one or more of the following:

in the DAPS handover procedure, the terminal device successfully accesses the target cell, and integrity check fails; or in the DAPS handover procedure, after the terminal device successfully accesses the target cell and before the terminal device receives the first message sent by the target network device, integrity check fails.

Figure 10:
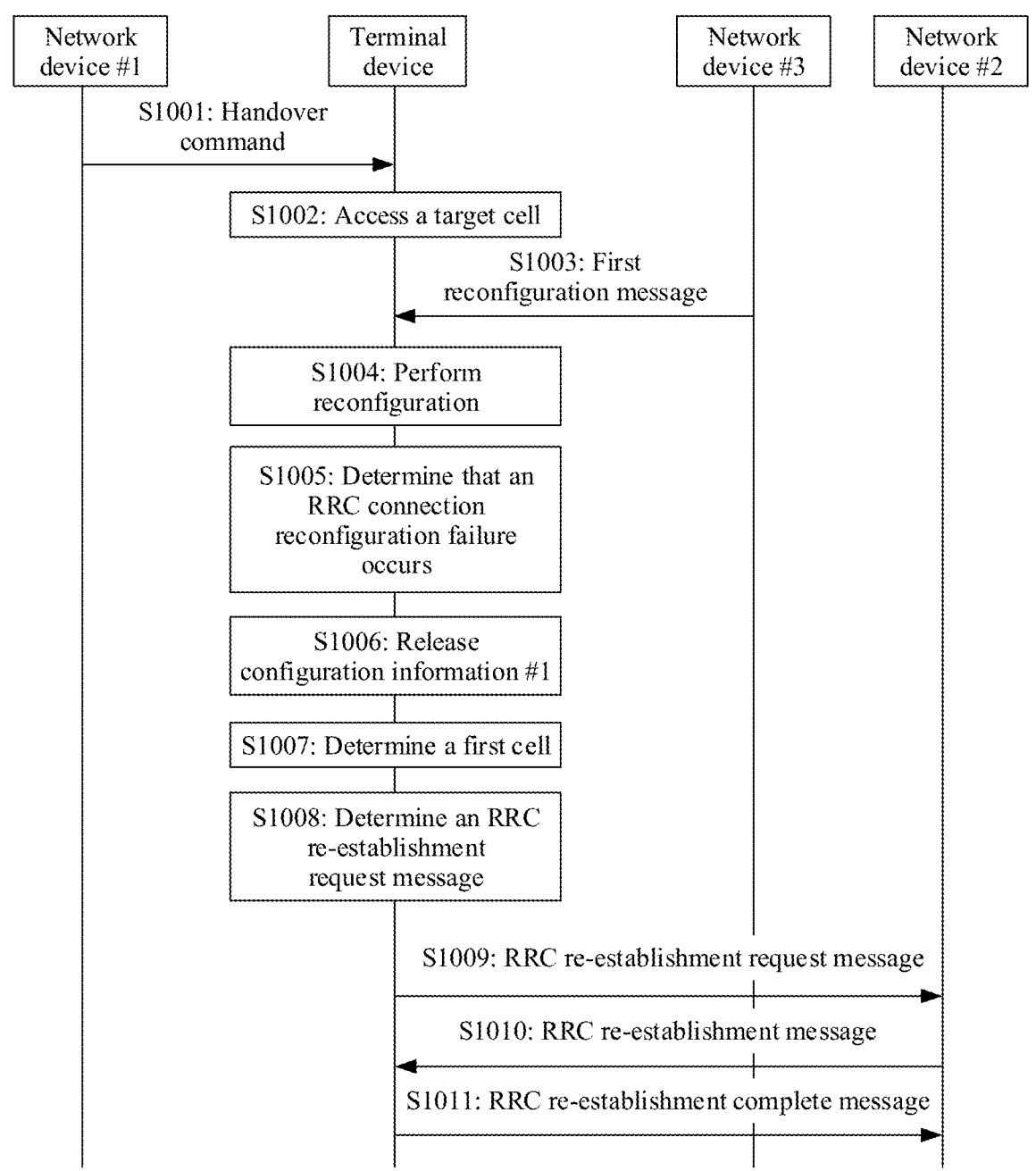

FIG. 10 shows a method for initiating RRC re-establishment by a terminal device if an RRC reconfiguration failure occurs in a target cell in a DAPS handover procedure according to an embodiment of this application. As shown in FIG. 10, the method 1000 includes S1001 to S1011. S1001 to S1005 are the same as S601 to S605 in the method 600. For brevity, details are not described again in this embodiment of this application.

S1006: The terminal device releases the configuration information #1 (an example of the first configuration information).

Optionally, the method further includes S10061: The terminal device determines to release the configuration information #1. Specifically, for an implementation of the step, refer to related descriptions in S2301.

In a possible implementation, before S10061, the method further includes S10062: The terminal device receives indication information from a network device, where the indication information indicates a priority of applying or releasing configuration information by the terminal device. Specifically, for an implementation of the step, refer to related descriptions in S2302.

In another possible implementation, before S10061, the method further includes S10063: A network device presets indication information, where the indication information indicates a priority of applying or releasing configuration information by the terminal device. Specifically, for an implementation of the step, refer to related descriptions in S2303. That the terminal device releases the configuration information #1 may be understood as that the terminal device deletes the stored configuration information #1, or the terminal device releases a link between the terminal device and the target cell, or the terminal device releases a link between the terminal device and the target network device.

In this embodiment of this application, in the DAPS handover procedure, if determining that the link failure occurs, the terminal device releases the configuration information used in the target cell. This reduces memory consumption of the terminal device.

S1007: The terminal device determines a first cell.

The first cell is a cell in which the terminal device initiates re-establishment.

The terminal device may determine the first cell based on an implementation inside the terminal device of the terminal device or according to a predefined criterion. For example, the terminal device may select, from a neighboring cell, a cell that meets the predefined criterion. The predefined criterion may be a cell selection S criterion. For example, the terminal device performs cell selection, and uses a cell that meets the cell selection S criterion as the first cell.

It should be understood that the first cell determined by the terminal device may be a cell to which the source network device belongs or a cell to which a non-target network device belongs. This is not limited in this embodiment of this application.

S1008: The terminal device determines an RRC re-establishment request message.

Specifically, the terminal device determines the RRC re-establishment request message based on second configuration information.

The RRC re-establishment request message includes one or more of the following parameters: a PCI of the source cell, a C-RNTI and a short MAC-I used by the terminal device in the source cell.

The shortMAC-I is set to the 16 least significant bits of a MAC-I, and calculation steps are as follows:

(1) Encode VarShortMAC-Input by using ASN.1.

(2) Use a KRRCint key and an integrity protection algorithm in the source cell.

(3) Set all input bits for COUNT, BEARER, and DIRECTION to binary.

Optionally, the RRC re-establishment request message may further include second indication information. The second indication information indicates that a reconfiguration failure occurs in the DAPS handover procedure, or a reconfiguration failure occurs in the target cell in the DAPS handover procedure; or in the DAPS handover procedure, after the terminal device successfully accesses the target cell and before the terminal device receives the source cell release message sent by the target network device to the terminal device, a reconfiguration failure occurs on the terminal device.

S1009: The terminal device sends the RRC re-establishment request message in the first cell. To be specific, the terminal device sends the RRC re-establishment request message to a network device #2 (a network device to which the first cell belongs).

S1010: The network device #2 sends the RRC re-establishment message to the terminal device.

S1011: The terminal device sends an RRC re-establishment complete message to the network device #2.

In this embodiment of this application, in the DAPS handover procedure of the terminal device, if an RRC reconfiguration failure occurs in the target cell, the terminal device releases the configuration information used in the target cell, so that a part of memory of the terminal device can be released. This simplifies implementation of the terminal device. In addition, after the configuration information used in the target cell is released, the terminal device has only the configuration information used in the source cell. This resolves a problem that the terminal device cannot send the RRC re-establishment request message based on the stored configuration information.

As described above, in the DAPS handover procedure, if the terminal device has not received, for a long time, indication information for releasing the configuration information used in the source cell from the target network device, the terminal device needs to maintain the configuration used in the source cell for a long time. Consequently, a part of memory of the terminal device is occupied for a long time.

Therefore, an embodiment of this application further provides a communication method, to avoid that in a DAPS handover procedure, a terminal device needs to maintain a configuration of a source cell for a long time if the terminal device has not received, for a long time, indication information sent by a target network device for releasing configuration information used in the source cell.

Figure 11:
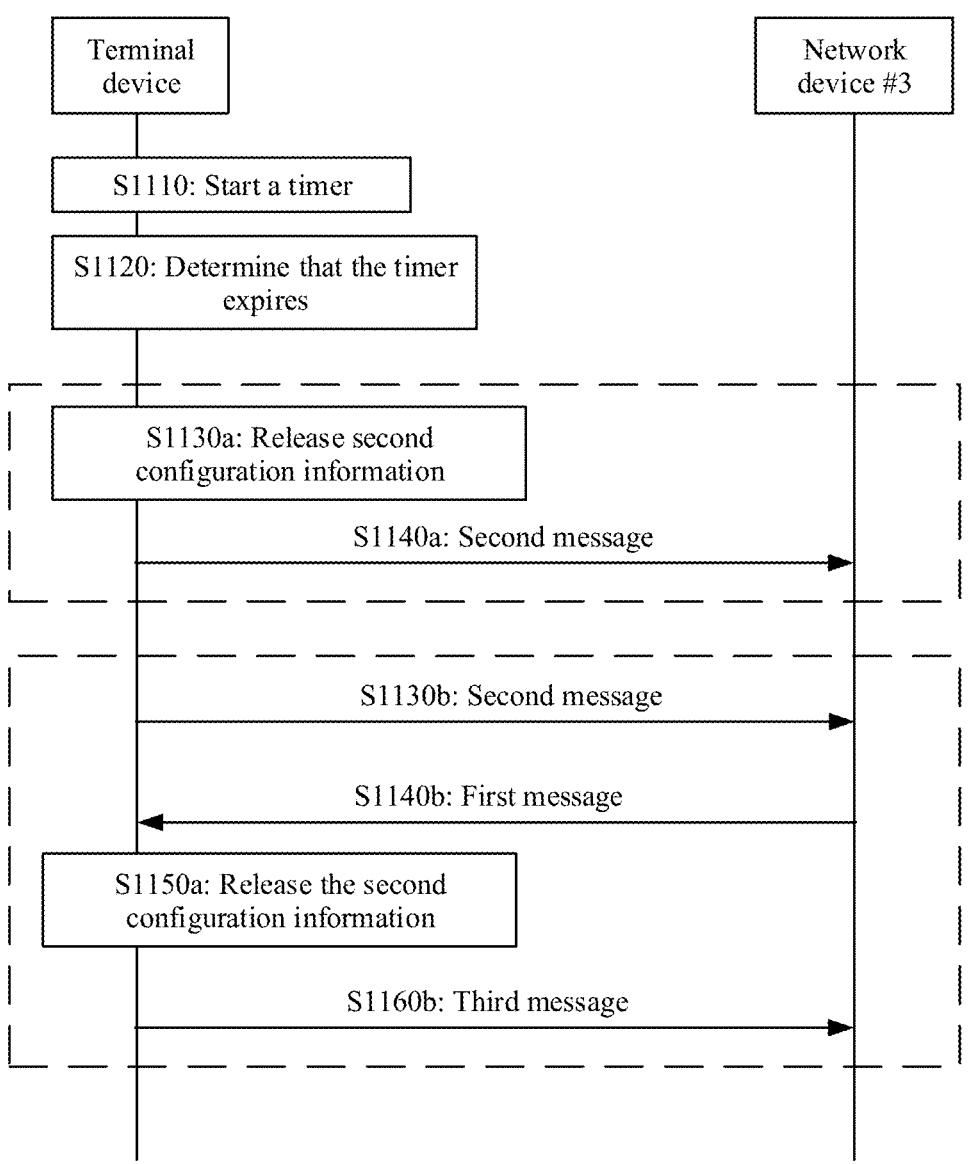
FIG. 11 is a schematic flowchart of a communication method according to an embodiment of this application.

FIG. 11 is a schematic flowchart of a communication method 1100 from a perspective of device interaction according to an embodiment of this application. As shown in FIG. 11, the method 1100 may include S1110 to S1160. The following describes steps in the method 1100 in detail.

S1110: In a DAPS handover procedure, a terminal device starts a timer after successfully accessing a target cell.

S1120: Before receiving a first message from a network device #3 (a network device to which the target cell belongs), the terminal device determines that the timer expires.

The first message indicates to release configuration information #2 (an example of first configuration information).

Optionally, if the terminal device does not receive the first message, the terminal device may determine that the timer expires.

Optionally, if the terminal device does not release the configuration information #2, the terminal device may determine that the timer expires.

Duration of the timer may be delivered by the network device #3 to the terminal device in advance by using signaling, or may be predefined. This is not limited in this embodiment of this application.

If the terminal device determines that the timer expires, there may be two processing manners. Manner 1 includes S1130a and S1140a. Manner 2 includes S1130b to S1160b. Manner 1:

S1130a: The terminal device releases the second configuration information.

S1140a: The terminal device sends a second message to the network device #3, where the second message indicates that the terminal device does not receive the first message, or indicates that the terminal device fails to receive the first message.

Manner 2:

S1130b: The terminal device sends a second message to a network device #4, where the second message indicates that the terminal device does not receive the first message, or indicates that the terminal device fails to receive the first message.

S1140b: The network device #3 sends the first message to the terminal device.

The first message may include a first RRC signaling identifier.

S1150b: The terminal device releases the second configuration information.

S1160b: The terminal device sends a third message to the network device #3, where the third message indicates that the terminal device has received the first message.

If the first message includes the first RRC signaling identifier, the third message also includes the first RRC signaling identifier.

In this embodiment of this application, in the DAPS handover procedure, the terminal device may start the timer after accessing the target cell. When the timer expires, if the terminal device has not received, from the network device to which the target cell belongs, a message for releasing configuration information used in the source cell, the terminal device may actively release the configuration information used in the source cell, or send a message to the network device to which the target cell belongs, to indicate that the terminal device does not receive the message for releasing the configuration information used in the source cell. Further, the network device to which the target cell belongs may send or re-send, to the terminal device, the message for releasing the configuration information used in the source cell. Further, the terminal device releases the configuration information used in the source cell. This avoids a problem that the terminal device needs to maintain the configuration information used in the source cell for a long time in the DAPS handover procedure.

It should be understood that the foregoing describes in detail a plurality of embodiments provided in this application with reference to a plurality of accompanying drawings. In the foregoing embodiments, sequence numbers of the processes do not mean execution sequences. The execution sequences of the processes should be determined based on functions and internal logic of the processes, and should not be construed as any limitation on the implementation processes of embodiments of this application.

The methods according to embodiments of this application are described above in detail with reference to FIG. 2 to FIG. 11. Apparatuses provided in embodiments of this application are described below in detail with reference to FIG. 12 and FIG. 13.

Figure 12:
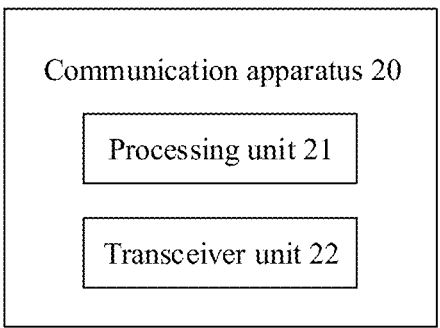
FIG. 12 is a schematic block diagram of a communication apparatus according to an embodiment of this application.

FIG. 12 is a schematic block diagram of a communication apparatus 20 according to an embodiment of this application. As shown in FIG. 12, the communication apparatus 20 may include a processing unit 21 and a transceiver unit 22.

In a possible design, the communication apparatus 20 may implement operations corresponding to the terminal device in the foregoing method embodiments. For example, the communication apparatus may be a terminal device, or a component, such as a chip or a circuit, configured in the terminal device.

The terminal device 20 may implement corresponding operations of the terminal device in the method embodiments shown in FIG. 2 to FIG. 11. The communication apparatus 20 may include units configured to perform the methods performed by the terminal device in the method embodiments shown in FIG. 2 to FIG. 11. In addition, the units in the communication apparatus 10 and the foregoing other operations and/or functions are respectively used for implementing corresponding procedures in the method embodiments shown in FIG. 2 to FIG. 11.

When the communication apparatus 20 is configured to perform the method 200 in FIG. 2, the processing unit 21 may be configured to perform S220 to S250 in the method 200, and the transceiver unit 22 may be configured to perform S210 and S260 in the method 200. It should be understood that a specific process in which the units perform the foregoing corresponding steps is described in detail in the foregoing method embodiments, and for brevity, details are not described herein.

When the communication apparatus 20 is configured to perform the method 300 in FIG. 3, the processing unit 21 may be configured to perform S320 to S350 in the method 300, and the transceiver unit 22 may be configured to perform S310 and S360 in the method 300. It should be understood that a specific process in which the units perform the foregoing corresponding steps is described in detail in the foregoing method embodiments, and for brevity, details are not described herein.

When the communication apparatus 20 is configured to perform the method 400 in FIG. 4, the processing unit 21 may be configured to perform S420 to S450 in the method 400, and the transceiver unit 22 may be configured to perform S410 and S460 in the method 400. It should be understood that a specific process in which the units perform the foregoing corresponding steps is described in detail in the foregoing method embodiments, and for brevity, details are not described herein.

When the communication apparatus 20 is configured to perform the method 500 in FIG. 5, the processing unit 21 may be configured to perform S520 to S550 in the method 500, and the transceiver unit 22 may be configured to perform S510 and S560 in the method 500. It should be understood that a specific process in which the units perform the foregoing corresponding steps is described in detail in the foregoing method embodiments, and for brevity, details are not described herein.

When the communication apparatus 20 is configured to perform the method 600 in FIG. 6, the processing unit 21 may be configured to perform S602 and S604 to S608 in the method 600, and the transceiver unit 22 may be configured to perform S601, S603, and S609 to S611 in the method 600. It should be understood that a specific process in which the units perform the foregoing corresponding steps is described in detail in the foregoing method embodiments, and for brevity, details are not described herein.

When the communication apparatus 20 is configured to perform the method 700 in FIG. 7, the processing unit 21 may be configured to perform S702 to S706 in the method 700, and the transceiver unit 22 may be configured to perform S701, S707, and S709 in the method 700. It should be understood that a specific process in which the units perform the foregoing corresponding steps is described in detail in the foregoing method embodiments, and for brevity, details are not described herein.

When the communication apparatus 20 is configured to perform the method 800 in FIG. 8, the processing unit 21 may be configured to perform S802, S804, and S805 in the method 800, and the transceiver unit 22 may be configured to perform S801 and S806 in the method 800. It should be understood that a specific process in which the units perform the foregoing corresponding steps is described in detail in the foregoing method embodiments, and for brevity, details are not described herein.

When the communication apparatus 20 is configured to perform the method 900 in FIG. 9, the processing unit 21 may be configured to perform S902 and S903 in the method 900, and the transceiver unit 22 may be configured to perform S901 and S904 in the method 900. It should be understood that a specific process in which the units perform the foregoing corresponding steps is described in detail in the foregoing method embodiments, and for brevity, details are not described herein.

When the communication apparatus 20 is configured to perform the method 1000 in FIG. 10, the processing unit 21 may be configured to perform S1002 and S1004 to S1008 in the method 1000, and the transceiver unit 22 may be configured to perform S1001, S1003, and S1009 to S1011 in the method 1000. It should be understood that a specific process in which the units perform the foregoing corresponding steps is described in detail in the foregoing method embodiments, and for brevity, details are not described herein.

When the communication apparatus 20 is configured to perform the method 1100 in FIG. 11, the processing unit 21 may be configured to perform S1110, S1120, S1130$a$, and S1150$a$ in the method 1100, and the transceiver unit 22 may be configured to perform S1140$a$, S1130$b$, S1140$b$, and S1160$b$ in the method 1100. It should be understood that a specific process in which the units perform the foregoing corresponding steps is described in detail in the foregoing method embodiments, and for brevity, details are not described herein.

Figure 13:
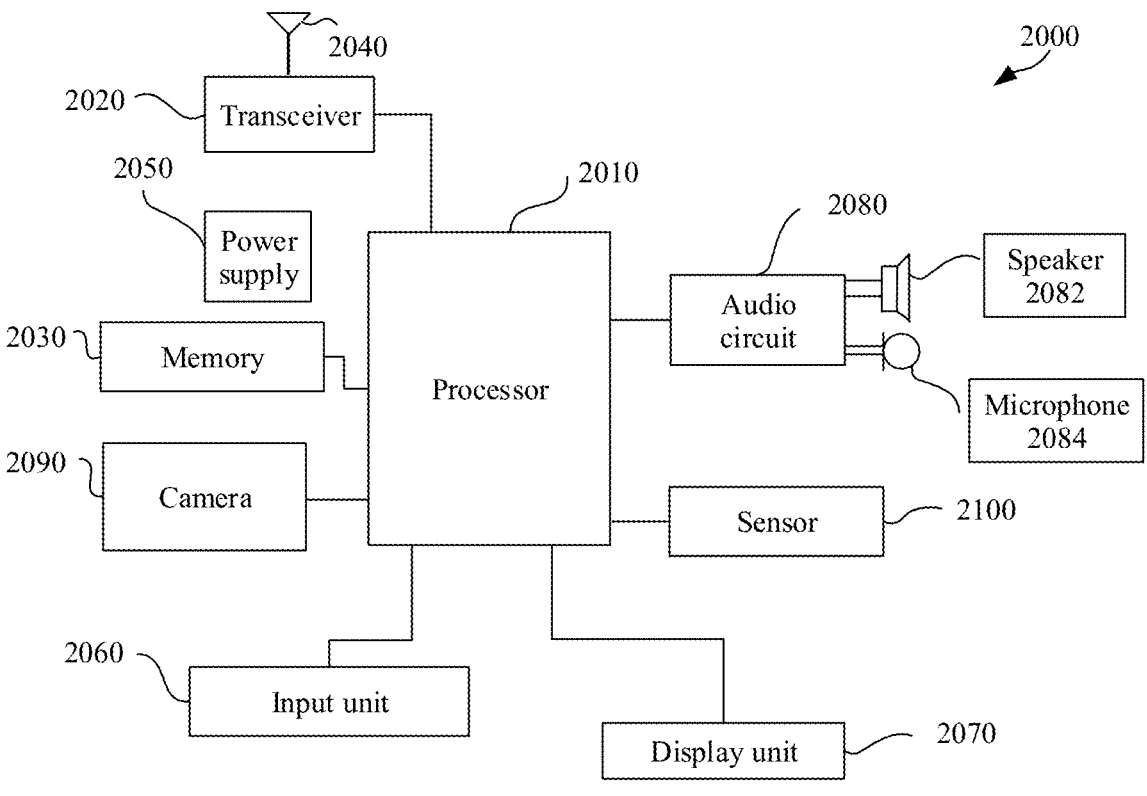
FIG. 13 is a schematic structural diagram of a terminal device according to an embodiment of this application.

It should be understood that the transceiver unit 22 in the communication apparatus 20 may be implemented by using a transceiver or a communication interface, for example, may correspond to a transceiver 2020 in a terminal device 2000 shown in FIG. 13. The processing unit 21 in the communication apparatus 20 may be implemented by using at least one processor, for example, may correspond to a processor 2010 in the terminal device 2000 shown in FIG. 13.

It should be further understood that when the communication apparatus 20 is a chip or a chip system configured in the terminal device, the transceiver unit 22 in the communication apparatus 20 may be implemented by an input/output interface, and the processing unit 21 in the communication apparatus 20 may be implemented by a processor, a microprocessor, an integrated circuit, or the like integrated in the chip or the chip system.

FIG. 13 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 3002, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 3000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit 21 in FIG. 12.

The transceiver 2020 may correspond to the transceiver unit 22 in FIG. 12. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 13 can implement the processes of the terminal device in the method embodiments shown in FIG. 2 to FIG. 11. Operations and/or functions of the modules in the terminal device 2000 are intended to implement the corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform a sending action by the terminal device for the network device or a receiving operation from the network device in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

Optionally, to improve the functions of the terminal device, the terminal device 3000 may further include one or more of an input unit 2060, a display unit 2070, an audio circuit 2080, a camera 2090, a sensor 2100, and the like, and the audio circuit may further include a speaker 2082, a microphone 2084, and the like.

An embodiment of this application further provides a communication apparatus, including a processor and a communication interface. The processor is configured to perform the method according to any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processing unit (central processor unit, CPU), a network processor (NP), a digital signal processing circuit (digital signal processor, DSP), a micro controller (micro controller unit, MCU), a programmable logic device (PLD), or another integrated chip.

In an implementation process, steps in the foregoing methods can be implemented by using a hardware integrated logical circuit in the processor, or by using instructions in a form of software. The steps of a method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method in any one of embodiments shown in FIG. 2 to FIG. 11.

According to the methods provided in embodiments of this application, this application further provides a computer-readable medium. The computer-readable medium stores program code. When the program code is run on a computer, the computer is enabled to perform the method in any one of embodiments shown in FIG. 2 to FIG. 11.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terminologies such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, functional units in embodiments of this application may be integrated into one processing unit, or each of the units may exist alone physically, or two or more units are integrated into one unit.

In the foregoing embodiments, all or some of the functions of the functional units may be implemented by using software, hardware, firmware, or any combination thereof. When software is used to implement embodiments, all or a part of embodiments may be implemented in a form of a computer program product. The computer program product includes one or more computer instructions (programs). When the computer program instructions (programs) are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

When the functions are implemented in the form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application may fall within the protection scope of this application.

What is claimed is:

1. A re-establishment method, comprising:
    receiving, by a terminal device, a handover command from a source network device, wherein the handover command indicates that the terminal device is to perform a dual active protocol stack (DAPS) handover from a source cell to a target cell, the handover command comprises first configuration information, and the first configuration information is configuration information used in the target cell;
    performing, by the terminal device, the DAPS handover, and after successfully accessing the target cell and before receiving a first message from a target network device indicating to release the source cell, determining that link failure has occurred in the target cell;
    releasing, by the terminal device, second configuration information, wherein the second configuration information is configuration information used in the source cell;
    determining, by the terminal device, a first cell;
    determining, by the terminal device, a radio resource control (RRC) re-establishment request message based on the first configuration information, wherein the RRC re-establishment request message comprises a cell-radio network temporary identifier (C-RNTI) used in the target cell and a short message authentication code for integrity (short MAC-I) used in the target cell; and
    sending, by the terminal device, the RRC re-establishment request message in the first cell.

2. The method according to claim 1, wherein determining that link failure has occurred is further based on determining that one or more of the following cases occur in the target cell or the source cell:
    an RRC connection reconfiguration failure occurs;
    integrity check fails;
    a quantity of radio link control (RLC) retransmissions reaches a preset threshold;
    a timer T310 expires; or
    random access fails and a timer T311 is not running.

3. The method according to claim 1, wherein determining that link failure has occurred is based on determining that an RRC connection reconfiguration failure occurs in the target cell, and wherein determining that the RRC connection reconfiguration failure occurs in the target cell comprises:
    receiving a first reconfiguration message from the target network device, wherein the first reconfiguration message comprises third configuration information, and the third configuration information is new configuration information used in the target cell;
    performing reconfiguration based on the first reconfiguration message; and
    determining that the RRC connection reconfiguration failure occurs in the target cell.

4. The method according to claim 3, wherein the first reconfiguration message is received from the target network device in a DAPS handover procedure, after successfully accessing the target cell and before receiving the first message indicating to release the source cell from the target network device.

5. The method according to claim 3, wherein the first reconfiguration message further comprises first indication information, and the first indication information indicates to release the second configuration information.

6. The method according to claim 1, wherein determining that link failure has occurred is based on determining that one or more of the following cases occur in a handover procedure:
    inter-system handover fails; or
    intra-system handover fails.

7. The method according to claim 1, wherein the first cell is a cell to which the target network device belongs or a cell to which a non-source network device belongs.

8. The method according to claim 1, wherein the RRC re-establishment request message comprises second indication information, and the second indication information indicates the link failure.

9. The method according to claim 1, wherein the RRC re-establishment request message further comprises: a physical cell identifier (PCI) of the target cell.

10. The method according to claim 1, further comprising:
    in a DAPS handover procedure, starting a timer after successfully accessing the target cell;
    before receiving the first message indicating to release the source cell from the target network device, determining that the timer expires; and
    sending a second message to the target network device, wherein the second message indicates that the first message has not been received or indicates that the first message failed to be received.

11. An apparatus, comprising:
    one or more processors; and
    one or more memories coupled to the one or more processors and storing programming instructions;
    wherein the one or more processors are configured to execute the programming instructions to facilitate performance of the following by the apparatus:
    receiving a handover command from a source network device, wherein the handover command indicates that the apparatus is to perform a dual active protocol stack (DAPS) handover from a source cell to a target cell, the handover command comprises first configuration information, and the first configuration information is configuration information used in the target cell;
    performing the DAPS handover, and after successfully accessing the target cell and before receiving a first message indicating to release the source cell from a target network device, determining that link failure has occurred in the target cell;
    releasing second configuration information, wherein the second configuration information is configuration information used in the source cell;
    determining a first cell;
    determining a radio resource control (RRC) re-establishment request message based on the first configuration information, wherein the RRC re-establishment request message comprises a cell-radio network temporary identifier (C-RNTI) used in the target cell and a short message authentication code for integrity (short MAC-I) used in the target cell; and
    sending the RRC re-establishment request message in the first cell.

12. The apparatus according to claim 11, wherein determining that link failure has occurred is further based on determining that one or more of the following cases occur in the target cell or the source cell:

an RRC connection reconfiguration failure occurs;

integrity check fails;

a quantity of radio link control (RLC) retransmissions reaches a preset threshold;

a timer T310 expires; or random access fails and a timer T311 is not running.

13. The apparatus according to claim 11, wherein determining that link failure has occurred is based on determining that an RRC connection reconfiguration failure occurs in the target cell, wherein determining that the RRC connection reconfiguration failure occurs in the target cell comprises:

receiving a first reconfiguration message from the target network device, wherein the first reconfiguration message comprises third configuration information, and the third configuration information is new configuration information used in the target cell;

performing reconfiguration based on the first reconfiguration message; and determining that the RRC connection reconfiguration failure occurs in the target cell.

14. The apparatus according to claim 13, wherein the first reconfiguration message is received from the target network device in a DAPS handover procedure, after successfully accessing the target cell and before receiving the first message indicating to release the source cell from the target network device.

15. The apparatus according to claim 13, wherein the first reconfiguration message further comprises first indication information, and the first indication information indicates to release the second configuration information.

16. The apparatus according to claim 11, wherein determining that link failure occurs is based on determining that one or more of the following cases occur in a handover procedure:

inter-system handover fails; or intra-system handover fails.

17. The apparatus according to claim 11, wherein the first cell is a cell to which the target network device belongs or a cell to which a non-source network device belongs.

18. The apparatus according to claim 11, wherein the RRC re-establishment request message comprises second indication information, and the second indication information indicates the link failure.

19. The apparatus according to claim 11, wherein the RRC re-establishment request message further comprises: a physical cell identifier (PCI) of the target cell.

20. A non-transitory computer-readable storage medium having processor-executable instructions stored thereon, wherein the processor-executable instructions, when executed, facilitate:

receiving a handover command from a source network device, wherein the handover command indicates a dual active protocol stack (DAPS) handover from a source cell to a target cell, the handover command comprises first configuration information, and the first configuration information is configuration information used in the target cell;

performing the DAPS handover, and after successfully accessing the target cell and before receiving a first message indicating to release the source cell from a target network device, determining that link failure has occurred in the target cell;

releasing second configuration information, wherein the second configuration information is configuration information used in the source cell;

determining a first cell;

determining a radio resource control (RRC) re-establishment request message based on the first configuration information, wherein the RRC re-establishment request message comprises a cell-radio network temporary identifier (C-RNTI) used in the target cell and a short message authentication code for integrity (short MAC-I) used in the target cell; and sending the RRC re-establishment request message in the first cell.

\* \* \* \* \*